United States Patent
Nicholson et al.

(10) Patent No.: US 9,904,281 B2
(45) Date of Patent: Feb. 27, 2018

(54) COMPUTER NUMERICAL CONTROL ASSEMBLY OR PROCESSING OF COMPONENTS

(71) Applicant: TRANSFORMIX ENGINEERING INC., Kingston (CA)

(72) Inventors: Kenneth Wayne Nicholson, Kingston (CA); Philip David Munroe, Kingston (CA); Martin George Smith, Kingston (CA); Robert David Almas, Kingston (CA)

(73) Assignee: TRANSFORMIX ENGINEERING INC., Ringston, Ontario (CA)

(*) Notice: Subject to any disclaimer, the term of this patent is extended or adjusted under 35 U.S.C. 154(b) by 989 days.

(21) Appl. No.: 14/087,419

(22) Filed: Nov. 22, 2013

(65) Prior Publication Data
US 2014/0148936 A1 May 29, 2014

Related U.S. Application Data

(60) Provisional application No. 61/729,480, filed on Nov. 23, 2012, provisional application No. 61/782,758, filed on Mar. 14, 2013.

(51) Int. Cl.
*G05B 19/418* (2006.01)
*G05B 19/18* (2006.01)
*B23P 21/00* (2006.01)

(52) U.S. Cl.
CPC ....... *G05B 19/41815* (2013.01); *G05B 19/18* (2013.01); *B23P 21/00* (2013.01); *G05B 2219/31044* (2013.01); *Y02P 90/04* (2015.11); *Y02P 90/08* (2015.11); *Y02P 90/16* (2015.11); *Y02P 90/185* (2015.11)

(58) Field of Classification Search
None
See application file for complete search history.

(56) References Cited

U.S. PATENT DOCUMENTS 4,604,704 A * 8/1986 Eaves ............... G06Q 10/08
198/460.1
4,620,347 A 11/1986 Stark
(Continued)

FOREIGN PATENT DOCUMENTS

CN 1275115 A 11/2000
CN 1748286A A 3/2006
(Continued)

OTHER PUBLICATIONS

European Search Report for EP 13856718.5 dated Dec. 15, 2015.
(Continued)

*Primary Examiner* — Qing Wu
(74) *Attorney, Agent, or Firm* — Bhole IP Law; Anil Bhole

(57) ABSTRACT

The invention relates to an automated method of assembling or processing components using computer numerical controlled drives to decouple the stages of delivering components to a tool, into a series of separately programmable stages, namely, a component loading stage, a component separating stage, an accelerating stage and a delivery stage, wherein the timing, position, speed, velocity, and acceleration of each component during each stage is selected through programming of the computer numerical controls.

42 Claims, 21 Drawing Sheets

(56) References Cited

U.S. PATENT DOCUMENTS

| | | | |
|---|---|---|---|
| 4,623,047 A | | 11/1986 | Kleinhagen, Jr. |
| 5,473,975 A | * | 12/1995 | Bruno .................. A47J 37/0857 219/388 |
| 8,005,563 B2 | | 8/2011 | Cobb et al. |
| 2005/0085359 A1 | | 4/2005 | Stave et al. |
| 2009/0112349 A1 | | 4/2009 | Cobb et al. |

FOREIGN PATENT DOCUMENTS

| | | | |
|---|---|---|---|
| CN | 101578162 A | 11/2009 |
| GB | 1360441 A | 7/1971 |
| GB | 1360441 A | 7/1974 |
| GB | 2225651 S | 10/1989 |
| GB | 2225651 A | 6/1990 |

OTHER PUBLICATIONS

XYZ: Electronic Camming Improves Pick-and-Place; "Assembly Magazine" Mar. 1, 2012; http://www.assemblymag.com/articles/print/89833.

Using Electronic Cams for Motion Control; Machine Design/Technologies; Motion System Design, Langnau, Leslie, Jul. 1, 2000; http://machinedesign.com.

International Search Report and Written Opinion dated Feb. 10, 2014 PCT/CA2013/000974.

Formal Examination Report; Chinese Patent Office; dated Dec. 16, 2016.

Australian Patent Examination Report No. 1 (dated Sep. 30, 2016).

* cited by examiner

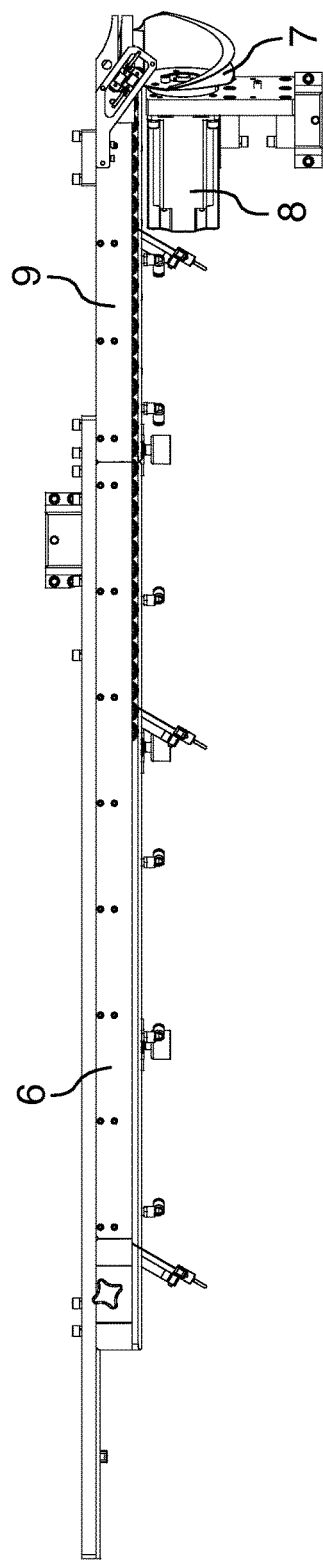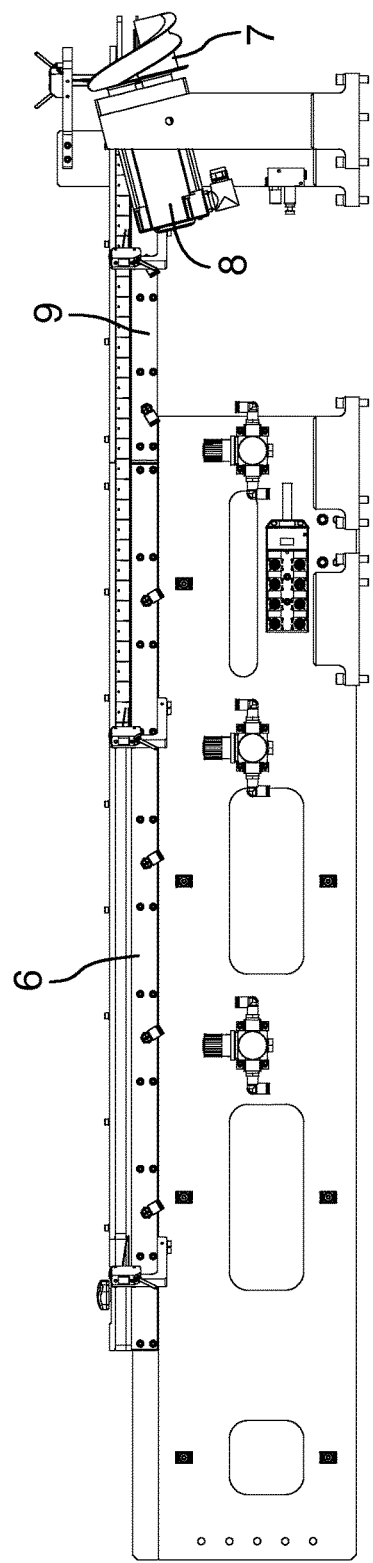

COMPUTER NUMERICAL CONTROL ASSEMBLY OR PROCESSING OF COMPONENTS

RELATED APPLICATIONS

This application claims the benefit of priority from U.S. Provisional Patent Applications 61/729,480 filed Nov. 23, 2012 and 61/782,758 filed Mar. 14, 2013.

TECHNICAL FIELD

The invention relates to an automated method of assembling or processing components using computer numerical controlled drives to decouple the stages of delivering components to a tool, while one or both the tool and the component are stationary or in motion, in a series of separately programmable stages of a component delivery device, namely, a component loading stage, a component separating stage, a component accelerating stage and a delivery stage to the stationary or moving tool, wherein the timing, position, speed, velocity, and acceleration of the component during each stage is selected through programming of the computer numerical controls.

BACKGROUND OF THE ART

The automated assembly or processing of components is conventionally performed during continuous motion on a rotating platform or dial having multiple identical tools. Optionally robotic assembly or processing can occur in a "pick and place" system which can work with stationary or moving component parts and stationary or moving tools. The continuously moving tools on a continuous motion dial receive one or more components from one or more delivery devices along the rotary path of the tools on the dial. A single component is processed (such as folding, shaping, punching or turning processes), or multiple components are assembled together and ejected from the tools when the operations are completed. Typically tools are controlled with peripheral cam surfaces and the tool has a follower wheel that engages the cam surface to operate the tool through the repeating cycle that occurs on each revolution of the dial.

Since the tools are continuously rotating on the dial, the delivery devices must take a lead component from a stream of like components at a stationary or moving start position and accelerate the component to a speed that matches the tangential speed of the dial as the tool passes and the component is handed off from the delivery device to the tool on the rotating dial.

Output in finished pieces/minute can be expressed as follows:

Output=(1 piece/tool)×(number of tools/dial revolution)×(dial revolutions/minute)=number of pieces/minute.

In order to increase the output of processed or assembled finished pieces from a conventional continuous motion system, the number of multiple tools on a dial can be increased. Increasing the dial speed (dial revolutions/minute above) can also increase output. However when the dial speed increases, the speed at which components are handed over to the dial must increase as well. The dial speed has been found to be a limiting factor in increasing output due to the practical maximum speed at which conventional component delivery devices can operate reliably. As a result the conventional preference is to increase the number of tools on a dial to increase output. However individual tools are expensive to build and maintain, and multiplying the number of tools increases the costs and likelihood of equipment failure. Increasing the number of tools may also increase the diameter of the dial, resulting in a larger machine occupying greater floor space. Downtime increases as tool numbers increase since the operation of the entire dial must be stopped if one tool malfunctions. Converting multiple tools to process or assemble new components also multiplies the costs of operating a conventional continuous motion system.

Therefore to reduce costs, a reduction in the number of tools is desirable. However to increase production the conventional approach has been to increase the number of tools per dial since a limiting factor has been the speed of dial rotation and matching speed at which components can be delivered and handed off to the continuously moving dial without errors or damaging components in the process.

Feed screws have been used to separate a lead component from an adjacent component, accelerate components to the tangential speed of the continuously moving dial and tools and match component delivery to the pitch or spacing between adjacent tools on the dial. As spacing between tools on the dial increases, the screw pitch must be increased equally. The screw pitch must match the circumferential spacing between tools on the dial so that component delivery is timed to coincide with the arrival of the tools at the position where the component is handed off to the tool from the screw. As spacing between tools on the dial is increased, and the screw pitch is increased the component engagement angle of contact between the component and the helical groove of the screw becomes more acute resulting in less axially directed force and more radially directed force. Components may be damaged or jammed as a result of the combination of radial and axial forces exerted on the components by the conventional feed screw and guides at high speeds. To increase output, the speed of rotating the dial or the number of tools on the dial must be increased. In either case the rate of delivery of components by the feed screw must also be increased to ensure component delivery coincides with arrival of multiple tools in succession at the component hand off position. However using conventional continuous motion methods, it has not been possible to increase output without also requiring multiple tools positioned on a dial.

Continuous motion assembly and processing has been limited to certain types of components and to maximum practical speeds due to limitations in the delivery of components using conventional processes and equipment. As a consequence typical dials hold 10 to 50 identical tools that are cam operated or operated by fluid power. The adoption of electronic controls and servo drive motors for actuation has been impeded by the costs involved in use of multiple tools and the practical limits in handing off components at high speed using conventional feed screws. Programmable robots have been used for complex operations and provide a high level of flexibility in adapting to varying operations through programmed motion control, however at a very high cost for high volume repetitive processes.

Features that distinguish the present invention from the background art will be apparent from review of the disclosure, drawings and description of the invention presented below.

DISCLOSURE OF THE INVENTION

The invention provides an automated device comprising: a first delivery device including: a first component presentation tool; and a first dedicated computer numerically controlled tool drive for loading, separating, accelerating and delivering a first component, from an intake position at a leading end of a stream of like first components, to output the first component at a predetermined delivery time, output position, speed, acceleration and trajectory; and a first receiving device including: a tool for receiving and processing the first component; and a tool drive for moving the tool between: the output position of the first component presentation tool; and a finished piece ejection position; wherein the first dedicated computer numerically controlled tool drive includes programmable controls to independently select the time, position, speed, acceleration and trajectory of the first component during a series of independently programmable first component stages, comprising: a loading stage; a separating stage; an accelerating stage; and a delivery stage.

In another aspect, the disclosure describes a method comprising: loading a first component at an intake position at a leading end of a stream of like first components; separating the first component from the like first components; accelerating the first component; delivering the first component at a predetermined delivery time, delivery position, delivery speed and moving along delivery trajectory using a first component presentation tool; receiving the first component at a processing tool moving along a processing tool trajectory configured to permit transfer of the first component at the delivery position from the first component presentation tool to the processing tool, the delivering of the first component and the receiving of the first component being electronically synchronized; processing the first component; and moving the first component to an ejection position.

In another aspect, the disclosure describes a system comprising: a component presentation tool configured to: load a first component at an intake position at a leading end of a stream of like first components; separate the first component from the like first components; accelerate the first component; and deliver the first component at a predetermined delivery time, delivery position, delivery speed and moving along a delivery trajectory; a processing tool configured to: receive the first component while the processing tool moves along a processing tool trajectory configured to permit transfer of the first component at the delivery position from the component presentation tool to the processing tool; process the first component; and move the first component to an ejection position; a data processor; and a medium comprising machine-readable instructions executable by the data processor and configured to cause the data processor to generate signals useful in the synchronization of the delivery of the first component by the component presentation tool and the receipt of the first component by the first component processing tool.

DESCRIPTION OF THE DRAWINGS

In order that the invention may be readily understood, one embodiment of the invention is illustrated by way of example in the accompanying drawings.

FIGS. 5, 6 and 7 are front, top and right side views respectively of the example of FIG. 4.

Further details of the invention and its advantages will be apparent from the detailed description included below.

DETAILED DESCRIPTION OF PREFERRED EMBODIMENTS

The limitations of prior art automated devices and component delivery methods will be described initially in order that the advantages of the invention may be understood against the background prior art.

Figure 17:
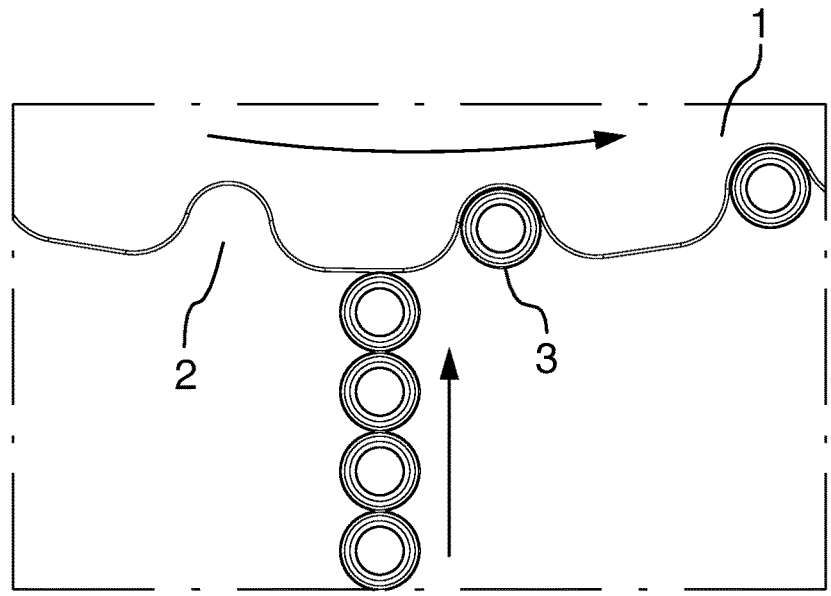
FIG. 17 is a plan view schematic of an example prior art dial where components are fed radially and captured in a nest to be accelerated rapidly in a circumferential direction.

FIG. 17 is a plan view schematic of an example prior art dial 1 having multiple nests 2 to capture components 3. Each nest 2 corresponds to an assembly tool mounted to the dial 1. The components 3 are fed radially in a stream and each is captured in the nest 2 to be accelerated rapidly in the circumferential direction. The radial to circumferential change in direction of movement forces the components 3 to experience a rapid acceleration. The radial movement of components 3 is not continuous since components are held in a substantially stationary or dwell position until the nest 2 arrives and the components 3 are moved rapidly into the nest 2 experiencing rapid radial acceleration to enter the nest and rapid radial deceleration once captured in the nest 2. To avoid damaging or jamming of the components 3, the rotary speed of the dial 1 is required to be relatively slow when such designs are employed to hand off components 3 in a continuous motion assembly system.

Figure 18:
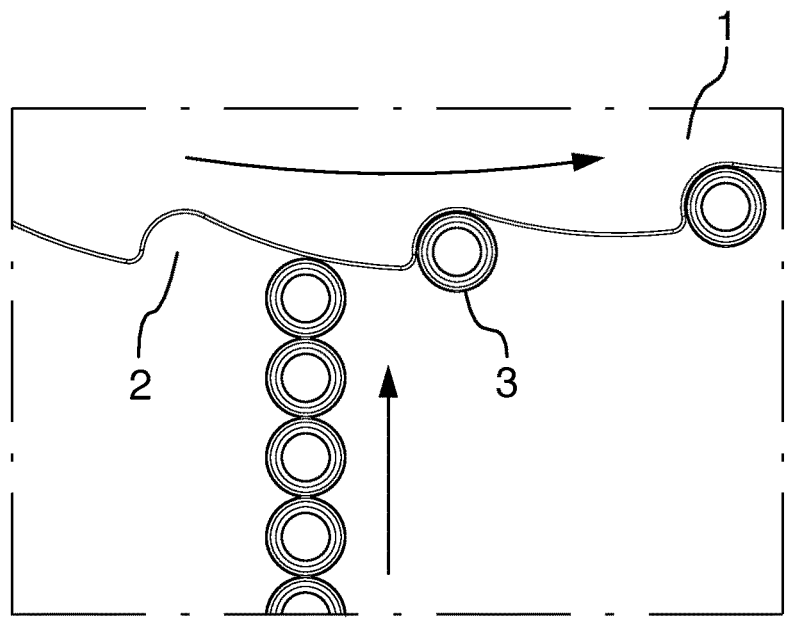
FIG. 18 is a plan view schematic of an example prior art dial where components are fed radially to engage a cam surface and are captured in a nest to be accelerated rapidly in a circumferential direction.

FIG. 18 is a plan view schematic of an example prior art saw-tooth dial 1 where components 3 are fed radially to engage a cam surface and are captured in a nest to be accelerated rapidly in a circumferential direction. The cam surface somewhat eases the radial acceleration/deceleration and conveys the stream of components 3 radially in a more continuous flow compared to the stop-start motion of the component stream in FIG. 17.

Figure 19:
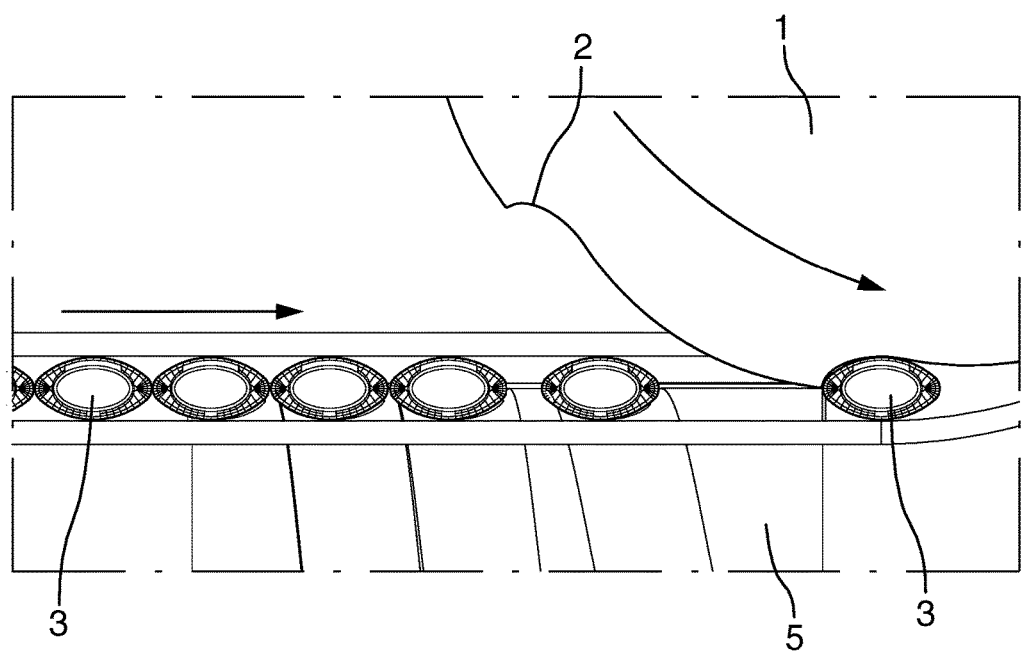
FIG. 19 is a plan view schematic of an example prior art dial where components are fed tangentially with a helical screw and are accelerated by the screw to match the tangential speed of the dial to be captured and continue on the dial in a circumferential direction.
Figure 20:
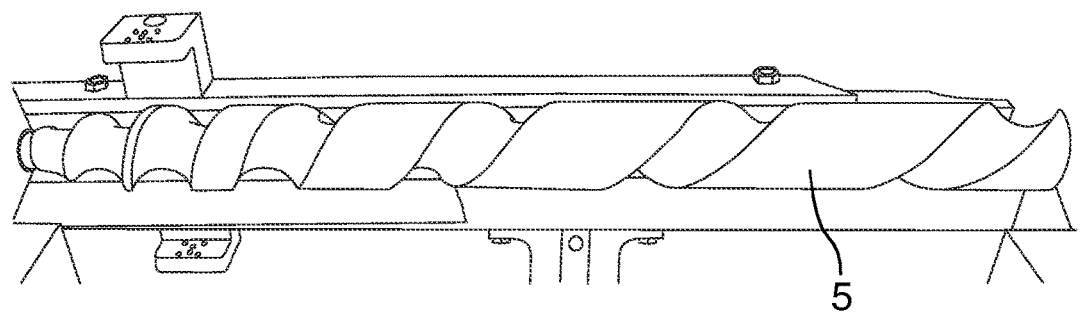
FIG. 20 is a photographic view of a prior art helical screw shown in the schematic of FIG. 19.

FIG. 19 is a plan view schematic of an example prior art dial 1 where components 3 are fed tangentially with a helical screw 5 and are accelerated by the helical screw 5 from a stream of adjacent components at the left to a speed to match the tangential speed of the dial 1. When components 3 are presented at the right side end of the helical screw 5 they are captured one by one and continue on the dial 1 in a circumferential direction. FIG. 20 is a photographic view of a prior art helical screw 5 shown in the schematic of FIG. 19. The helical screw 5 rotates at a constant speed and in order to take components 3 from a substantially stationary state or relatively slow moving state at the left end to a faster axial speed matching the tangential speed of the dial at the right end, the pitch of the helical groove is extended longitudinally.

Since the prior art helical groove will hold multiple components 3 along its length, the stages of loading a component 3 from a stream, separating a component from an adjacent component 3, accelerating the component 3 to the required tangential speed and handing off the component 3 to the dial 1 are all dependent on the rotary speed of the helical screw 5. If a designer attempts to increase the dial 1 speed to increase production, the speed of the helical screw 5 must also be increased. However all stages of handling the components 3 are tied to the same parameter, namely the rotary speed of the helical screw 5, and increasing the tangential speed of handing off the components at the right end also necessitates increasing the speed at which components are loaded at the left end. If it is desired to load a component slowly to avoid damage to the component and also desired to increase production by handing off components 3 to the dial more rapidly, the use of a conventional helical screw 5 forces a compromise. The speed at which components 3 can be delivered is limited by the speed at which they can be loaded. Accordingly it has been conventional to increase the number of tools on a dial 1 to increase production and to increase the speed of the dial 1 and matching helical screw 5. Conventional methods in any case dictate that multiple tools are required for high output continuous motion equipment which involves significant expense and maintenance activity.

FIGS. 1 to 14 illustrate a first example of the novel automated assembly device using a rotary screw as a component presentation tool.

Figure 1:
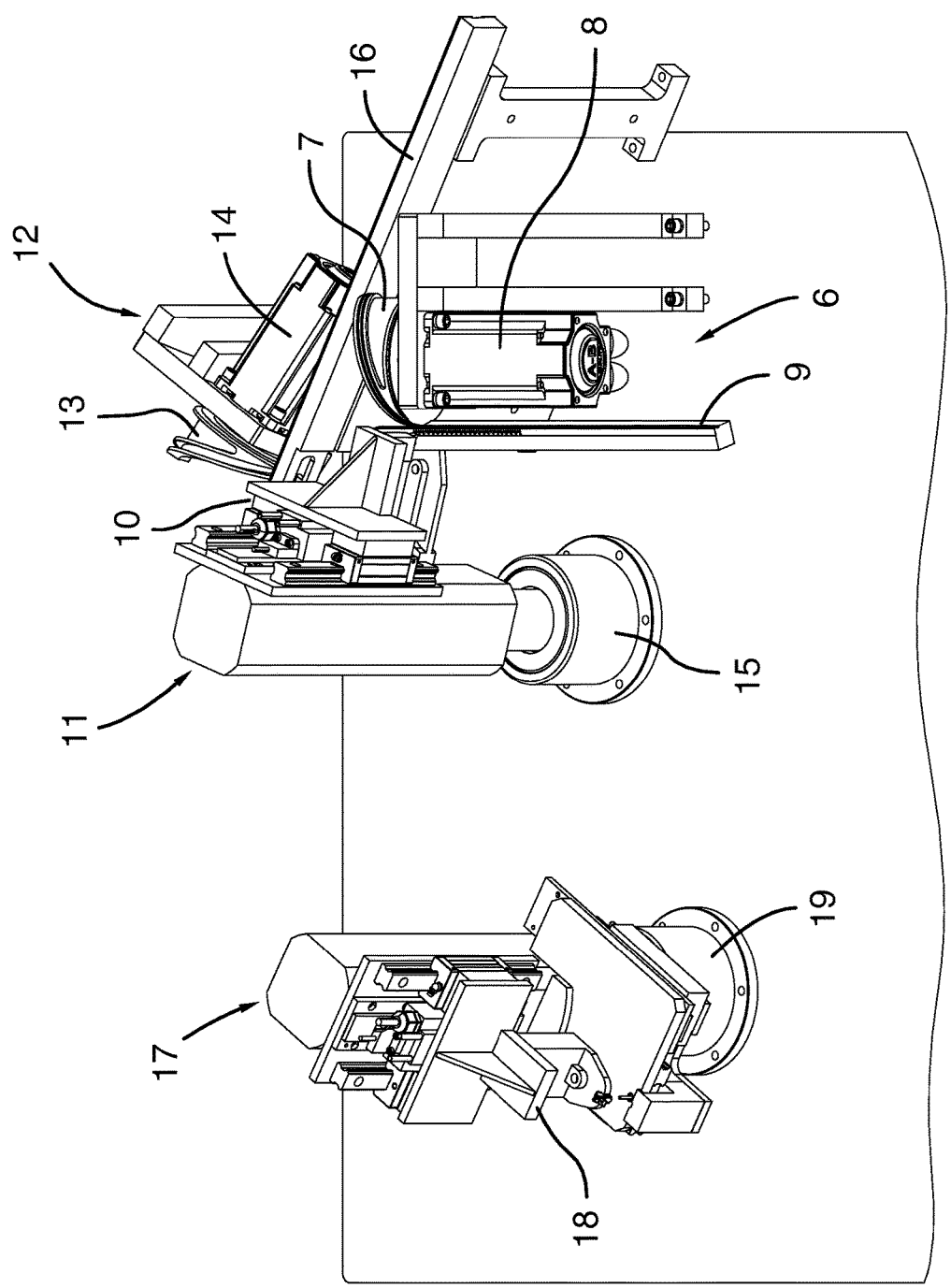
FIG. 1 is an isometric view of a first example automated device in accordance with the invention having a first component delivery device and a second component delivery device to the right, a first receiving device in the central area and a second receiving device to the left.

FIG. 1 shows a first example automated assembly device for assembling first and second components together. It will be understood that the automated device described herein can also be used to process a single component that is delivered to a moving tool on a receiving device for processes such as folding, bending or punching for example. Further the examples described in this application are restricted to assembling two parts together to present the concepts in a simple understandable manner. However it will be understood by those skilled in the relevant art that any number of components (1 to n) can be assembled together in a like manner by adding multiple tools and component feeding devices.

FIG. 1 shows a first component delivery device 6 that includes a rotary screw 7 driven by a dedicated numerically controlled servomotor 8. The first components are aligned in a linear guide 9 to present a stream to the rotary screw 7 which then loads a single component, separates the component from adjacent following components, accelerates the component and delivers the component to the assembly tool 10 of the receiving device 11. The receiving device 11 preferably has a servomotor 15 to rotate the assembly tool 10 counterclockwise in FIG. 1 and is maintained in continuous motion for high speed assembly.

The assembly tool 10 rotates counterclockwise to receive the second component from the second component delivery device 12, which also has a rotary screw 13 and a dedicated numerically controlled servomotor 14. The second components are aligned in a linear guide 16 to present a stream to the rotary screw 13 which then loads a single component, separates the component from adjacent following components, accelerates the component and delivers the component to the assembly tool 10 of the receiving device 11. The first and second components of the example are detained in the linear guides 9, 16 in a substantially stationary stream that shifts axially in a periodic motion. However it will be understood that the linear guides 9, 16 could house the components in a moving stream in situations where a moving stream is desired or has advantages.

Figure 24:
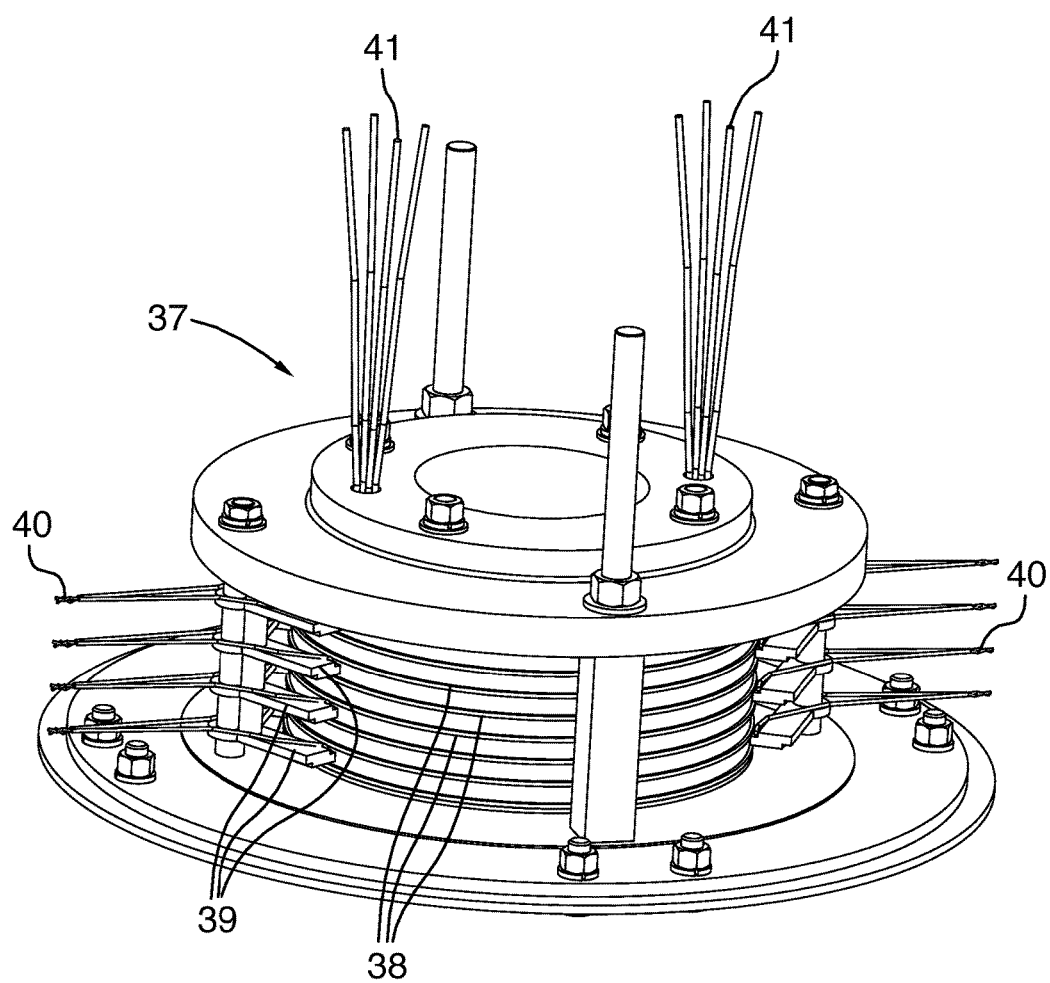
FIG. 24 is a perspective view of a slip ring for transmitting electrical power or control signals between a rotating tool platform and a stationary tool mounting structure.

The assembly tool 10 continues rotating counterclockwise and while doing so the first component and second component are assembled together by the assembly tool 10. The assembly tool 10 can include linear or rotary actuators powered by fluid power or by servomotors through an electric power supply slip ring 37 as shown in FIG. 24. The slip ring 37 is an electromechanical device that allows the transmission of electric power and electrical signals from a stationary structure to a rotating structure. A electro-mechanical slip ring 37 consists of an electrically conducting ring 38 and a conducting brush 39 that establishes an electrical connection as the ring 38 turns. Other slip rings are possible including those with optical conductors and optical signal transmission. A mechanical slip ring 37 with multiple ring turns 38 and brushes 39 allows for stationary wires 40 of a stationary servo drive to be electrically connected via rotating wires to a servomotor mounted on a rotating tool platform. Preferably two separate slip rings 37 are used, namely one slip ring 37 used to connect the power wiring to the rotating servo motors and a separate slip ring 37 to connect the encoder signal transmission wiring. By separating the connections the encoder signals are less prone to electrical noise created by the electrical power wiring.

FIG. 1 shows the first receiving device 11 in the central area and a second receiving device 17 to the left which also has an assembly tool 18 for performing further assembly or other operations, and a servomotor 19.

Figure 2:
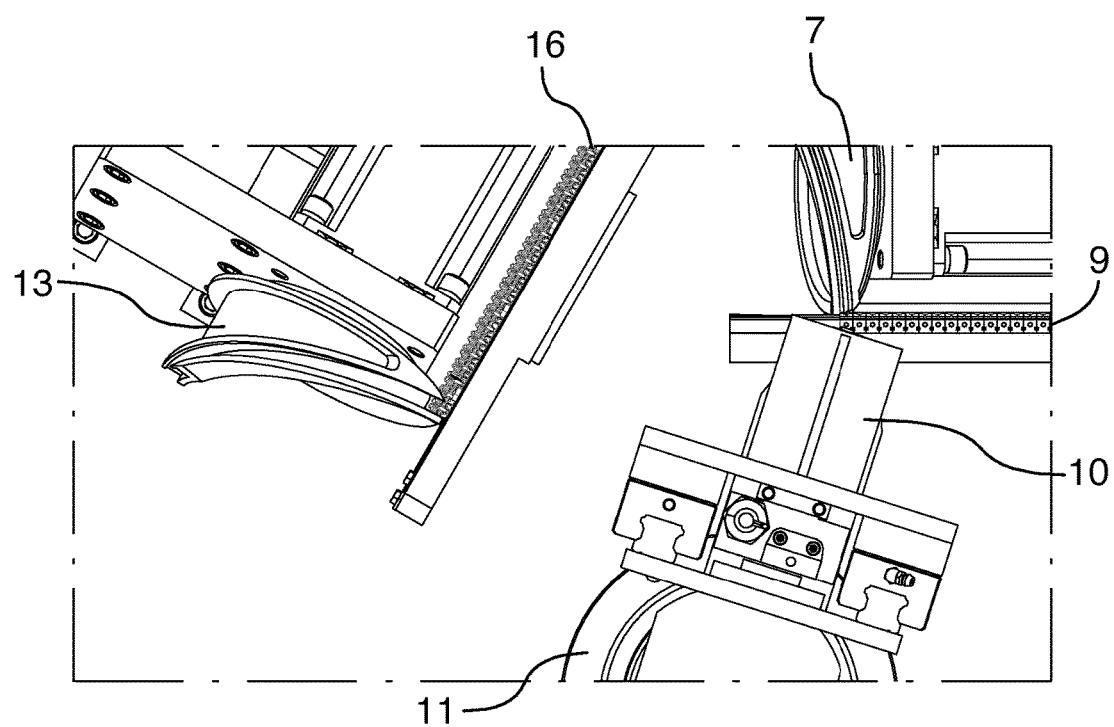
FIG. 2 is a plan view of the rotary screw first delivery device handing a first component from the linear stream to the receiving tool, which afterwards will rotate counterclockwise to receive the second component from the linear stream of second components delivered by a second rotary screw.

FIG. 2 shows a plan view detail of the rotary screw 7 first component delivery device handing a first component from the linear stream in the linear guide 9 to the receiving tool 10. The receiving tool 10 then rotates counterclockwise to receive the second component from the linear stream of second components in the linear guide 16 delivered by the second rotary screw 13.

Figure 3:
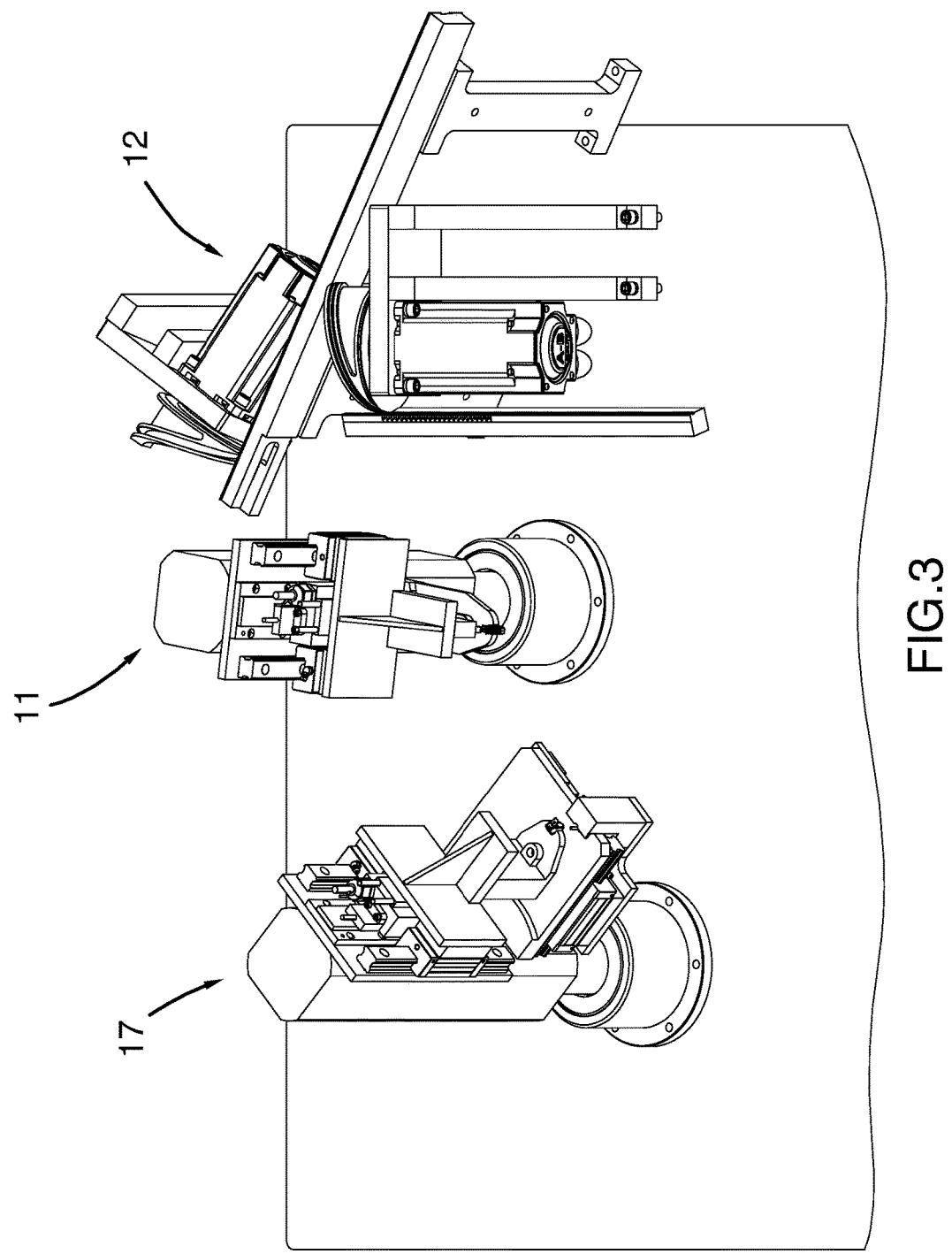
FIG. 3 is an isometric view similar to FIG. 1 with the first receiving device rotating between the first and second component delivery devices (on right) to the second receiving device (on left).

FIG. 3 is an isometric view similar to FIG. 1 showing the first receiving device 11 rotating counterclockwise before receiving the first and second components from the first and second component delivery devices (6, 12), and continuing by assembling the components before transferring the assembled components to the second receiving device 17.

Figure 4:
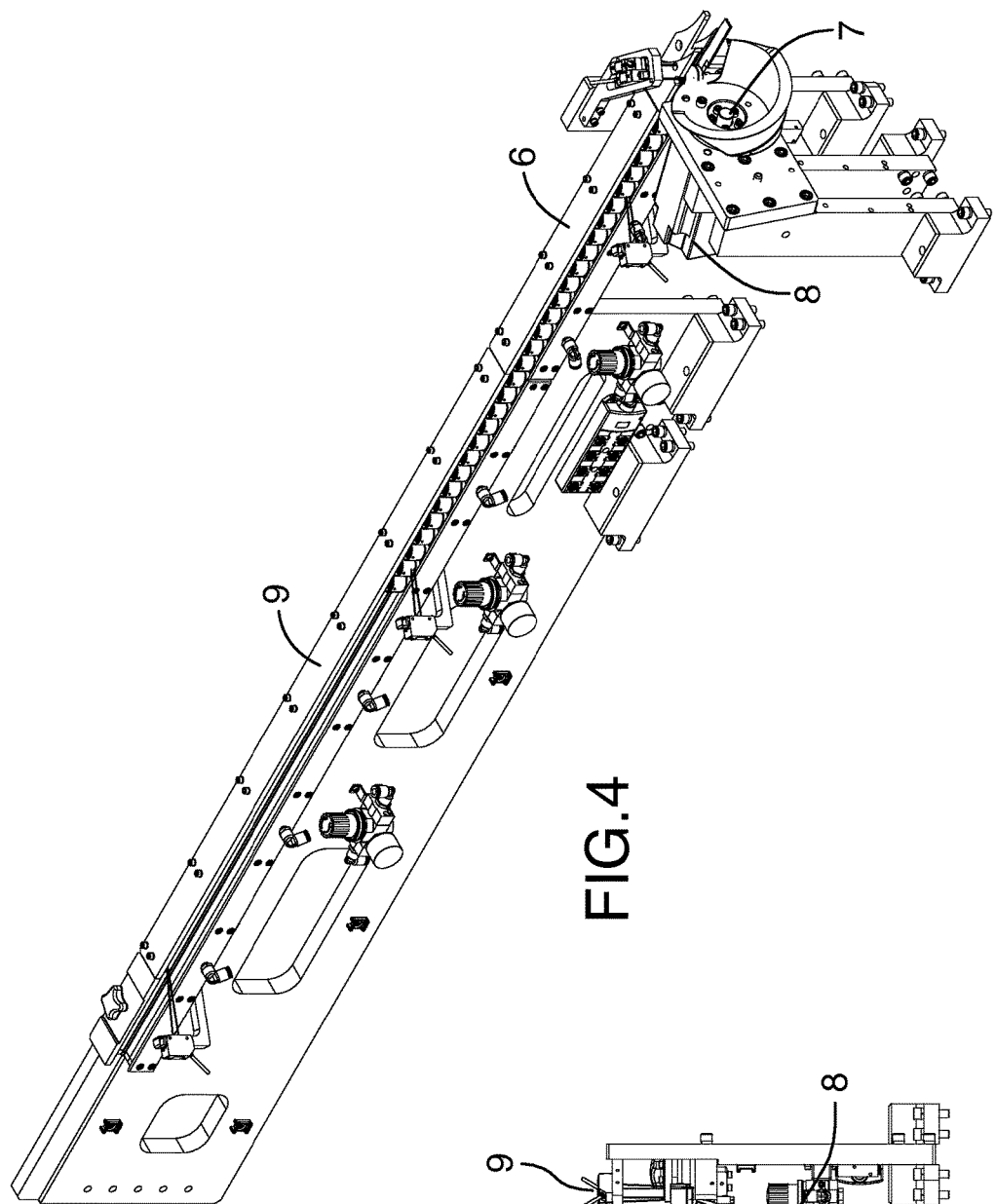
FIG. 4 is an isometric view of a second example showing a first component delivery device with a rotary screw first component presentation tool and a linear stream of first components feed from left to right in a stream towards the rotary screw.
Figure 5:
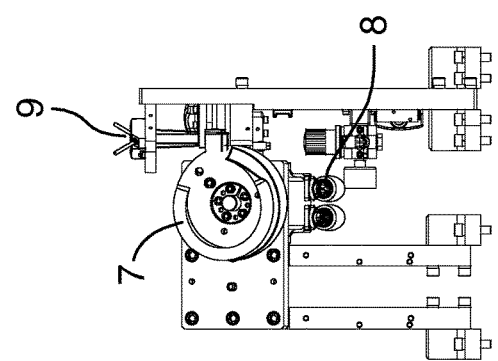

FIG. 4 is an isometric view of a second example of a first component delivery device 6 for delivering relatively larger components which require a larger linear guide 9. The first component delivery device 6 has a rotary screw 7 as a first component presentation tool driven by a servomotor 8. A linear stream of first components are guided in the linear guide 9 to feed from left to right in a stream towards the rotary screw 7. FIGS. 5, 6 and 7 are front, top and right side views respectively of the second larger example of the first component delivery device in FIG. 4. It will be understood that the delivery devices for multiple components can be substantially the same as described above and adapted for the shape of different components by providing suitable linear guides 9 and rotary screws 7. Accordingly, the component delivery device 6 can be quickly adapted for varying shapes of components while the bulk of machine parts can remain substantially unchanged.

Figure 10:
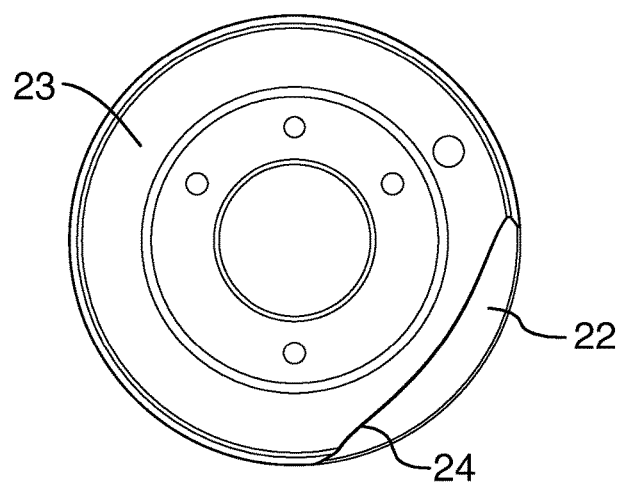
FIG. 10 is a proximal end view of the rotary screw of FIG. 9 with intake port at the lower right through the radially extending dwell shoulder.
Figure 11:
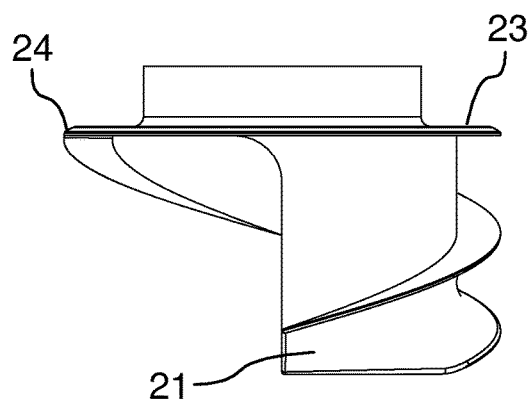
FIG. 11 is a top view of the rotary screw showing the component output port at the bottom and showing at the upper left the radially extending dwell shoulder and separating wedge adjacent the intake port.
Figure 12:
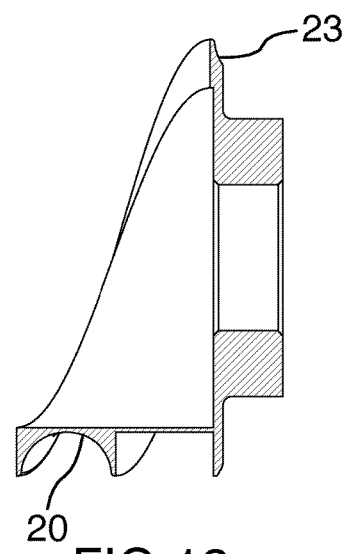
FIG. 12 is an axial sectional view of the rotary screw showing the uniform half circle cross sectional profile of the helical groove along its length that matches the cylindrical outer surface of the first component of the second example.

FIGS. 8-14 show the details of a rotary screw (7, 13) which in the example shown is adapted to deliver a cylindrical component. The example shown delivers a cylindrical component however other shapes of components can be accommodated by providing a rotary screw 7 with a suitably shaped helical groove 20. FIG. 12 best shows the helical groove 20 with a uniform half-circle cross sectional profile to engage and convey a cylindrical component. For a delivering rectangular component, a rectangular groove could be provided.

Figure 8:
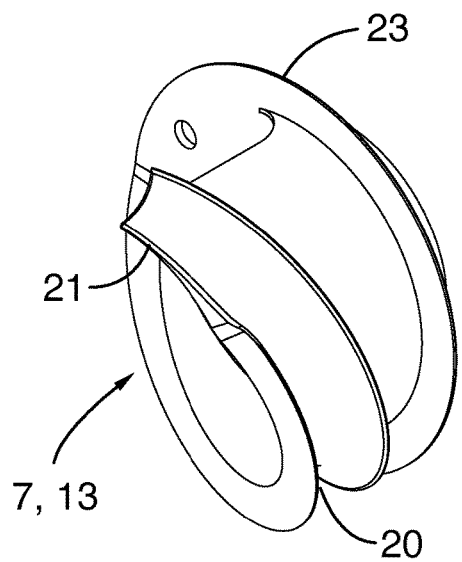
FIG. 8 is an isometric view of the distal end of the rotary screw first component presentation tool with the component output port from the helical groove shown to the upper left.
Figure 9:
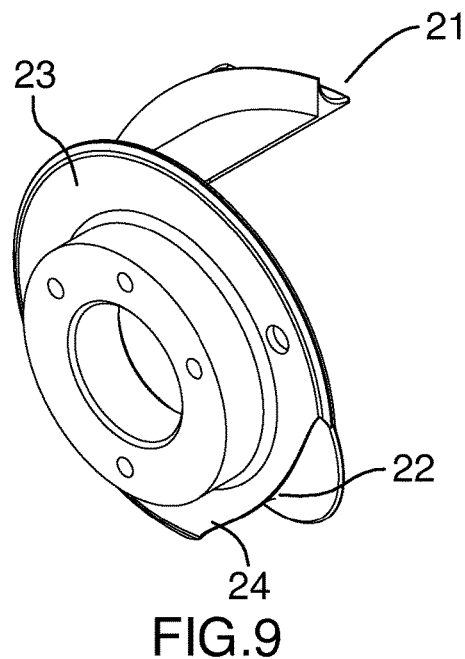
FIG. 9 is an isometric view of the proximal end of the rotary screw first component presentation tool with the component intake port into the helical groove shown to the lower right.

FIG. 8 is an isometric view of the distal end of the rotary screw 7, 13 which serves as a component presentation tool with the helical groove 20 terminating at the component output port 21. FIG. 9 is an isometric view of the proximal end of the rotary screw 7, 13 with the helical groove 20 commencing with a component intake port 22. FIG. 10 shows a proximal end view of the rotary screw 7, 13 with a radially extending dwell shoulder 23. The dwell shoulder 23 detains the following stream of components by abutting the following component while allowing the lead component in the stream to pass into the intake port 22 through the dwell shoulder 23.

Backpressure exerted on the component stream within the linear guide 9 urges a lead component in the stream toward the rotary screw 7, 13. A single component passes through the intake port 22 during each rotation of the rotary screw 7, 13. The single lead component is separated from the next following component of the stream of components by a separating wedge 24 formed on a downstream edge of the intake port 22. FIG. 11 is a side view of the rotary screw 7, 13 and shows the component output port 21, the radially extending dwell shoulder 23 and the end view of the separating wedge 24.

Figure 13:
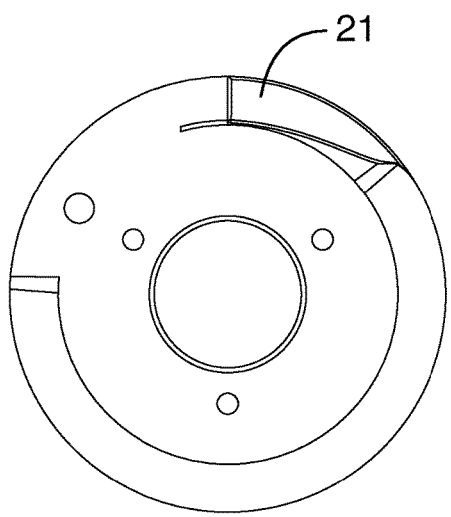
FIG. 13 is a distal end view of the rotary screw of FIG. 8 with output port at the lower right.
Figure 14:
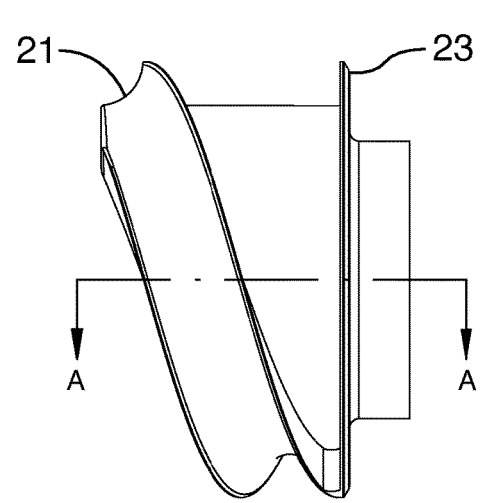
FIG. 14 is a side view of the rotary screw showing the profile of the helical groove at the end of the output port being a quarter circle shape.

FIGS. 12, 13 and 14 illustrate views of the rotary screw 7, 13 to complete the three dimensional depiction of the shape. The rotary screw 7, 13 has a uniform half circle cross sectional profile for the helical groove 20 along its length that matches the cylindrical outer surface of the example component. The dwell shoulder 23 allows only one component at a time to enter the helical groove 20 through the intake opening 22. The separating wedge 24 separates the next following component from the one component entering the helical groove 20. The helical groove 20 when rotated accelerates the component axially as the rotary screw 7, 13 drives the component in a stationary linear guide. The output port 21 serves to present the component to the receiving device 11 at a speed matching the tangential speed of the rotating assembly tool 10.

Since the rotary screw 7, 13 accepts and delivers one component for each rotation, and since the servomotor 8, 14 driving the rotary screw is electronically programmable to a precise rotary position, rotary speed and acceleration, each stage of delivering the component can be precisely controlled separately from the other stages.

Figure 15:
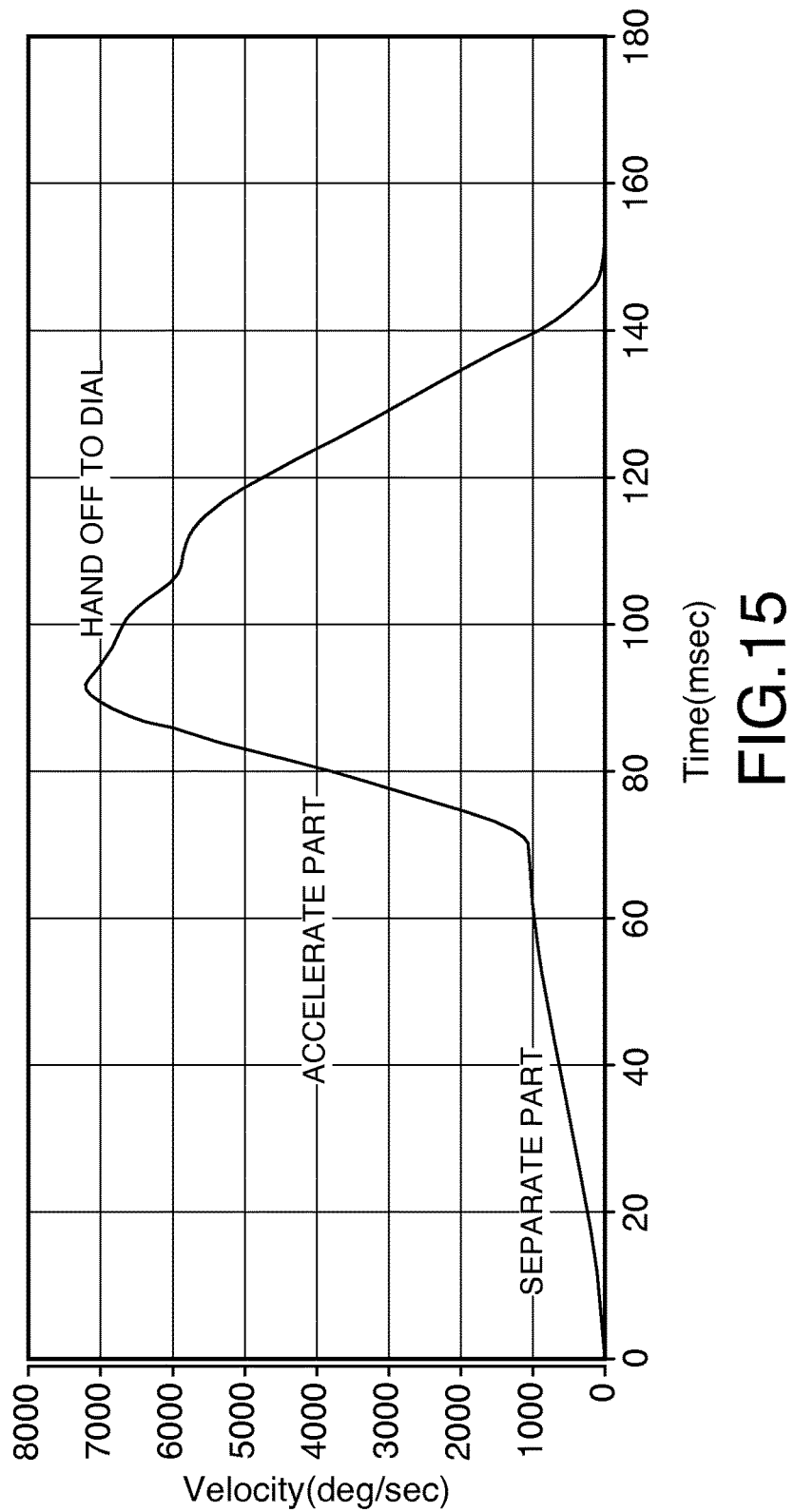
FIG. 15 is a graph illustrating an example profile of the variations in rotary speed (degrees/sec) of the rotary screw versus time to deliver a component to an example receiving device, where the variations are programmable when a rotary servomotor is used to drive the rotary screw.

FIG. 15 is a graph showing an example profile of rotary screw speed in degrees/sec versus time to deliver a component from intake to output. It will be noted that the conventional helical screw 5 of the prior art rotates at a constant speed and engages multiple components along its length. The variations shown in rotary speed from 0 to 7000 deg/sec in FIG. 15 are programmable when a rotary servomotor 8, 14 is used to drive the rotary screw 7, 13.

The cycle starts with the rotary screw 7 stationary as indicated at the left of FIG. 15 with velocity/speed of 0 deg/sec. The components can also begin the cycle while in motion (initial speed greater than 0 degrees/sec) depending on the linear guides or other upstream equipment and the component handling arrangements. In the example illustrated, at the cycle start the rotary screw 7 is in a stationary position detaining a lead component of the stream with the dwell shoulder 23. To load a single component to enter the helical groove 20, the rotary screw 7 is then rotated slowly (0-1000 deg/sec) to load a single component under back-pressure force through the intake port 22. The component will engage the downstream side of the helical groove 20 and substantially cease axial movement. The rotary screw 7 then slowly rotates further and the separating wedge 24 on the downstream edge of the intake opening 22 will be pushed between the component within the helical groove 20 and the next upstream component in the stream. On further slow rotation of the rotary screw 7 (0-1000 deg/sec) the separating wedge will completely separate the component in the helical groove 20 and the dwell shoulder 23 will detain the remaining stream of components in a stationary stream until the next rotation when the intake port 22 returns to the start position. If the components are to be held in the stream in a moving condition, the dwell shoulder 23 could be designed as a helical wall or the rotary screw 7, and servomotor 6, 14 could be mounted to an axially moving carriage to continue axial motion of the component stream.

Once the single component in the helical groove is completely separated from the component stream, the component can be accelerated axially up to the speed required to hand off the component at the output port 21 to the receiving device 11. The component is confined on one side by the helical groove and is confined on the opposite side within a sliding surface of the liner guide 9, 15. As indicated in FIG. 15, to axially accelerate the component confined within the helical groove 20, the rotary velocity/speed of the rotary screw 7, 13 is increased substantially for example from 1000 to 7000 deg/sec. When the required speed is reached at the required time, the component is presented at the output port 21 to be received by the assembly tool 10 of the receiving device 11. Thereafter as shown in FIG. 15, the now empty rotary screw 7, 13 having discharged the component, need only return to the start position again and can be decelerated to a stationary stop position to begin the cycle again with the next component in the stream being detained by the dwell shoulder 23.

Figure 16:
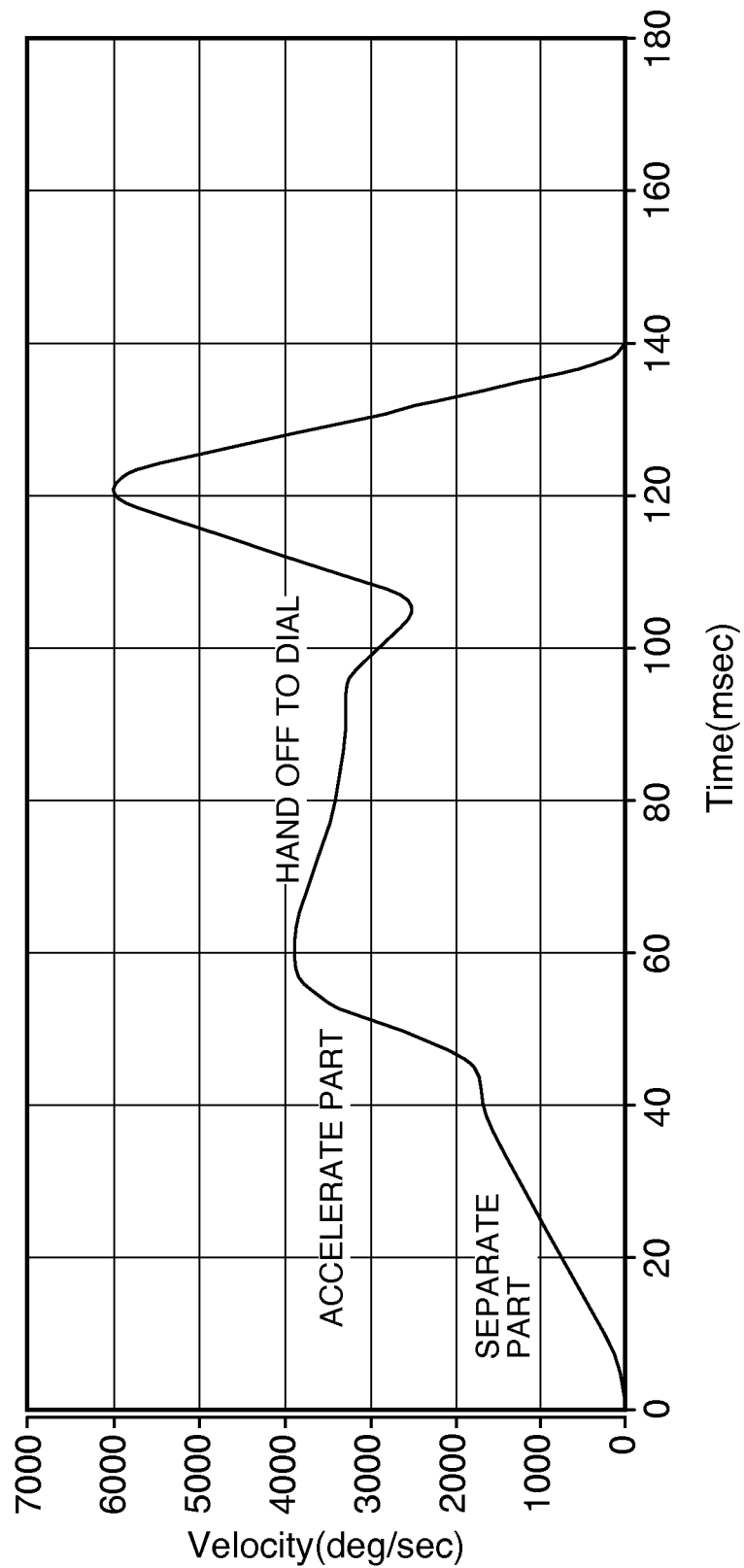
FIG. 16 is a graph similar to FIG. 15 showing a second example of the variations in rotary speed that can be programmed to rotate the rotary screw while retaining the same cycle time (150 milliseconds).

FIG. 16 is a graph similar to FIG. 15 to show how the programming of the servomotor 8, 14 can be adapted to follow different profiles for different components or different assembly methods. FIG. 16 shows a second example of the variations in rotary speed that can be programmed to rotate the rotary screw 7, 13 while retaining the same cycle time (150 milliseconds). In FIG. 16 a different component may have a different shape that enables the loading and separating stage to occur much faster (0-1500 deg/sec in 45 milliseconds whereas FIG. 15 shows the load and separate stage from 0-1000 deg/sec taking 70 milliseconds). The acceleration in the FIG. 16 example can occur during a shorter time range and at a slower hand off speed (4000 versus 7000 deg/sec). The example component in FIG. 16 requires a longer hand off time to the receiving device and after hand off is complete, in order to return back to the start position within the same cycle time (140 msec) the rotary screw 7 must accelerate rapidly then decelerate to a stationary velocity at the start position.

Therefore the combination of a rotary screw 7 that accepts one component per rotation and the programmable capability of the servomotor, enable any rotary velocity/speed versus time profile to be selected. The stages of moving the component from a stationary or moving stream to a delivery speed to hand off to a receiving device, can be separately programmed so that compromises need not be made between optimizing rotary speed during any stage. An optimum speed for loading, separating, accelerating and delivering may be selected separately and each stage is not dependent on the other stages.

Further since the rotary screw 7 is rotated at varying speeds, each segment of the rotary screw 20 can be shaped for the specific purpose of the stages of loading, separating, accelerating and delivering a component of a specific shape. To adapt the delivery device for different components, replacing the rotary screws 7, 13 and the linear guides 9, 16 is required, however other parts of the assembly device can be easily relocated and adapted for reuse.

The receiving devices 11, 17 can also have dedicated servomotors 15, 19 for programming precise positioning and rotary speed. Accordingly, the conventional dials 1 with multiple tools rotating at relatively slow speeds can be replaced with a single tool rotating at high speed. The costs associated with multiple tools can be avoided and the relatively higher cost of servomotors and programming the drive system can be justified due to the saving in tool costs.

Recapping the above description of a first example automated device, the device illustrated is designed for assembling a first component and a second component into a finished piece in a continuous motion assembly process. To do so the assembly device shown in FIGS. 1 and 3 has a first component delivery device 6 and a second component delivery device 12. The first component delivery device 6 includes a rotary screw 7 as a presentation tool to present the first component to the receiving device 11. It will be understood that the automated device can be used to deliver only one component if desired and the receiving device 11 instead of assembling components may have a tool 10 configured to process the one component, such as by bending, folding or punching.

The rotary screw 7 is driven by a servomotor 8 serving as a first dedicated computer numerically controlled tool drive for loading, separating, accelerating and delivering a first component from an intake position at a leading end of a stream of like first components to output the first component at a predetermined delivery time, output position, speed, acceleration and trajectory to be received by the assembly tool 10 of the receiving device 11.

To deliver a second component to the receiving device 11 for assembly in the assembly tool 10, the automated device can include a second delivery device 12 also having a like rotary screw 13 as a presentation tool for the second component. A servomotor 14 serves as a second tool drive for loading, separating, accelerating and delivering the second component, from an intake position at a leading end of a stream of like second components, to output the second component at a predetermined delivery time, output position, speed, acceleration and trajectory to be received by the assembly tool 10 of the receiving device 11 as it rotates counterclockwise.

The first receiving device 11 has a tool 10 for receiving and assembling the first component and the second component together. The first receiving device 11 is rotated precisely under programmed control of a servomotor 15 to move the assembly tool 10 between the output position of the first component rotary screw 7, the output position of the second component rotary screw 13 and a finished piece ejection position where the finished piece is handed off to the assembly tool 18 of a second receiving device 17.

The first component servomotor 8 serves as a dedicated computer numerically controlled tool drive with programmable controls to independently select the time, position, speed, acceleration and trajectory of the first component during a series of independently programmable first component stages, namely: a loading stage; a separating stage; an accelerating stage; and a delivery stage. The second component servomotor 14 equally serves for the second component delivery as a dedicated computer numerically controlled tool drive to independently select the time, position, speed, acceleration and trajectory of the second component during the independently programmable a loading stage; a separating stage; an accelerating stage; and a delivery stage of the second component.

The servomotor 15 that rotates the assembly tool also includes programmable controls to independently select the time, position, speed, acceleration and trajectory of the assembly tool during independently programmable assembly stages, namely: a first component receipt stage; a second component receipt stage; and a finished piece ejection stage.

As best shown in FIGS. 8-14, the rotary screws 7, 13 have a helical groove 20 with a semi-circular profile matching a cylindrical component. The rotary screws 7, 13 have an intake port 22 at proximal end of the helical groove 20 and an output port 21 at a distal end of the helical groove 20, for capturing and guiding the cylindrical first component axially along a linear guide 9, having a stationary axial slide surface. The rotary screws 7, 13 have a proximal dwell shoulder 23 extending radially into engagement with a forward surface of a lead component of the stream of like components and the intake port 22 is located in a segment of the dwell shoulder 23 to intake one component per rotation. A downstream edge of the intake port 22 serves as a separating wedge 24 for insertion between the lead first component and an adjacent following first component of the stream of components.

As shown in the example of FIG. 15, the servomotor 8, 14 for each rotary screw 7, 13 communicates with programmable controls to independently select the rotary speed of the components during: a loading stage wherein the rotary speed is 0 degree/sec; a separating stage wherein the rotary speed is 0-1000 degree/sec; an accelerating stage wherein the rotary speed is 1000-7000 degree/sec; and a delivery stage wherein the rotary speed is 7000-6000 degree/sec. FIG. 16 illustrates the different speeds and timing possible by selecting programming of the servomotors 8, 14 providing a high degree of flexibility in customizing the stages of component delivery.

The process described above can be adapted using different mechanisms. For example, rotary servomotors 8, 14 rotating a delivery tool in a two dimensional plane can be replaced with orthogonally aligned linear servomotors also operating in a plane to define using Cartesian coordinates a trajectory for any component mounted to them. The rotary screws 7 and 13 can be replaced with a rotary disc to load, separate, accelerate and deliver a component since each step can have a programmed position and speed selected with a servomotor. The tool 10 of the first receiving device 11 can be operated with fluid power, cams, a rotary servomotor or a linear servomotor. The type of tool 10 is unlimited and can be an assembly tool or a tool that processes a component or assembly of components. A separate control signal slip ring can be used for communicating electronic control signals between the rotating tool 10 and a stationary control system. The separation of a control signal slip ring and an electric power supply slip ring mitigates the interference or noise generated by the transmission of electric power from interfering with the low voltage control signals.

Figure 21:
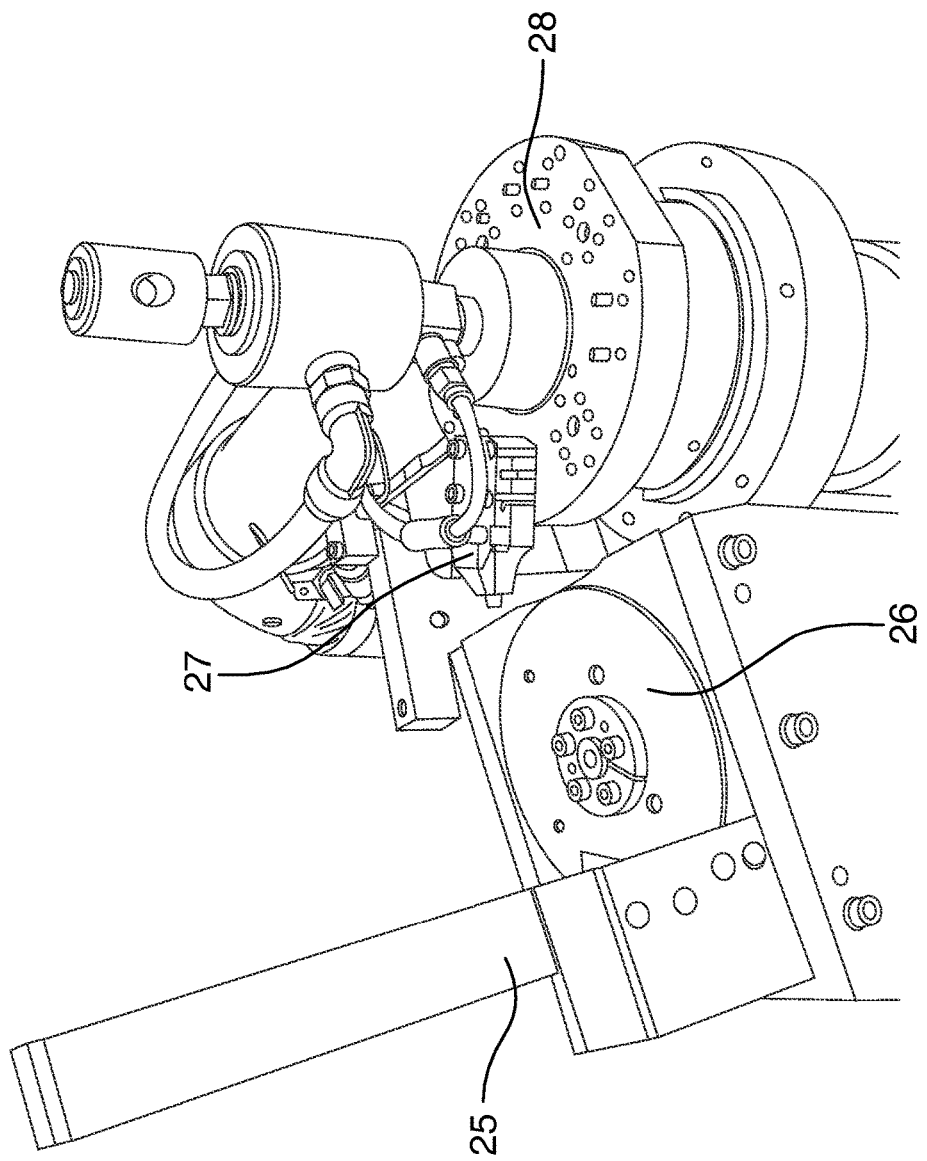
FIG. 21 is a photographic view of a second example automated device where first components are engaged in a rotary disc presentation tool (left) and delivered to a receiving device at the right.

A second example of an automated device is shown in FIG. 21 where first components are stacked in a substantially vertical linear guide 25. The components could also be conveyed in a guide oriented otherwise such as horizontal depending on the design parameters. One component at a time is engaged in a rotary disc 26 as a component presentation tool and delivered to a rotating tool 27 of a receiving device 28. As described above in connection with FIGS. 15-16, the rotary disc 26 can be completely stationary at the start of the cycle to receive a single component from the stream within the linear guide 25. Small or delicate components can be received easily when the rotary disc 26 is stationary. The component received in the disc 26 can be separated without damage from the stream of components by slowly beginning rotation of the rotary disc 26. Once completely separated the component and disc 26 can be accelerated rapidly to match the rotary speed of the tool 27 and to hand off the component to the tool 27. Once empty, the disc 26 can be rotated back to the start position and stopped until the next component is required from the stream housed within the linear guide 25.

The automated device of FIG. 21 has a component presentation tool in the form of a rotary disc 26 with a mounting recess to engage and hold the component. To avoid simply shearing the component, the rotary disc 26 may be kept stationary until the component loads into the recess. The dedicated computer numerically controlled rotary servomotor delivers the first component mounted on the rotary disc 26, from a stationary intake position, through a low speed separating stage, through a high speed accelerating stage, to present the first component at the output position and delivery speed. The variation in rotary speed can be programmed as indicated in FIGS. 15-16.

Figure 22:
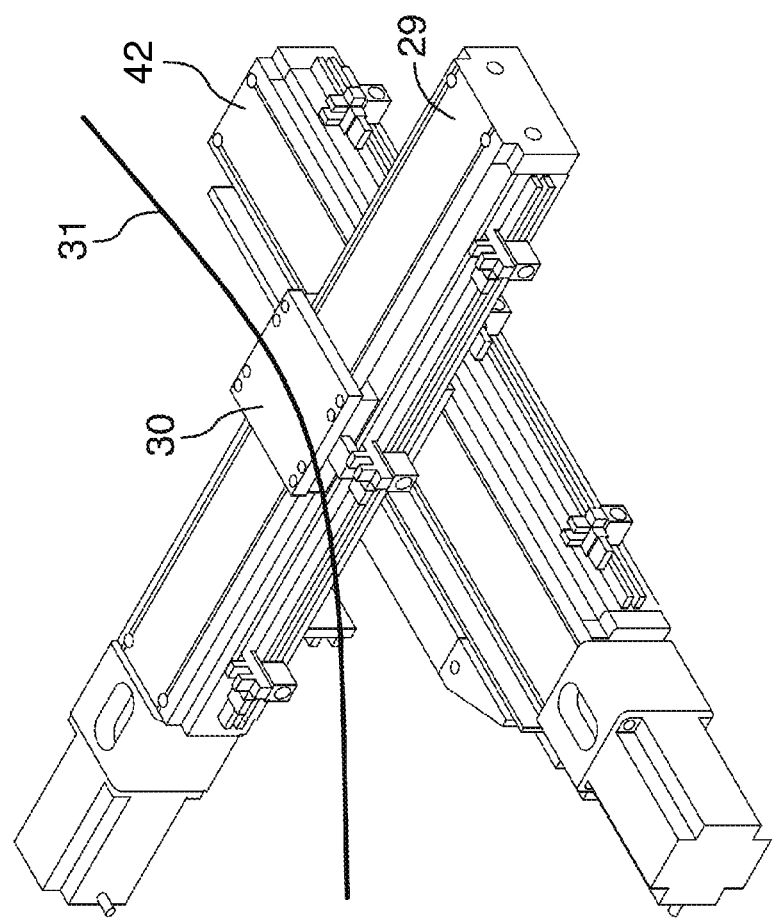
FIG. 22 is an isometric view of a third example of a first component delivery device that uses two orthogonally directed linear servomotors to move a platform holding the first components in an XY Cartesian coordinate manner within a plane.

FIG. 22 is an isometric view of a third example of a first component delivery device that uses two orthogonally directed linear servomotors 42, 29 to move a platform 30 that can include a fixture (not shown) to hold a single component and move the component in an XY Cartesian coordinate manner within a plane as indicated by the curved trajectory line 31. The platform 30 has a mounting (not shown) customized for component to engage and hold the component. The dedicated computer numerically controlled linear servomotors 42, 29 each have a linear operating axis disposed orthogonally relative to each other for loading, separating, accelerating and delivering the first component mounted on the platform, from a stationary intake position, through a low speed separating stage, to a high speed accelerating stage, and presents the component at the output position and delivery speed required using Cartesian coordinates. The same process can be adapted for three dimensional Cartesian coordinates using a third linear servomotor (not shown) with a linear operating axis disposed orthogonally relative to the planar pair of linear servomotors 42, 29 for loading, separating, accelerating and delivering the first component mounted on the platform within a three dimensional operating space.

Figure 23:
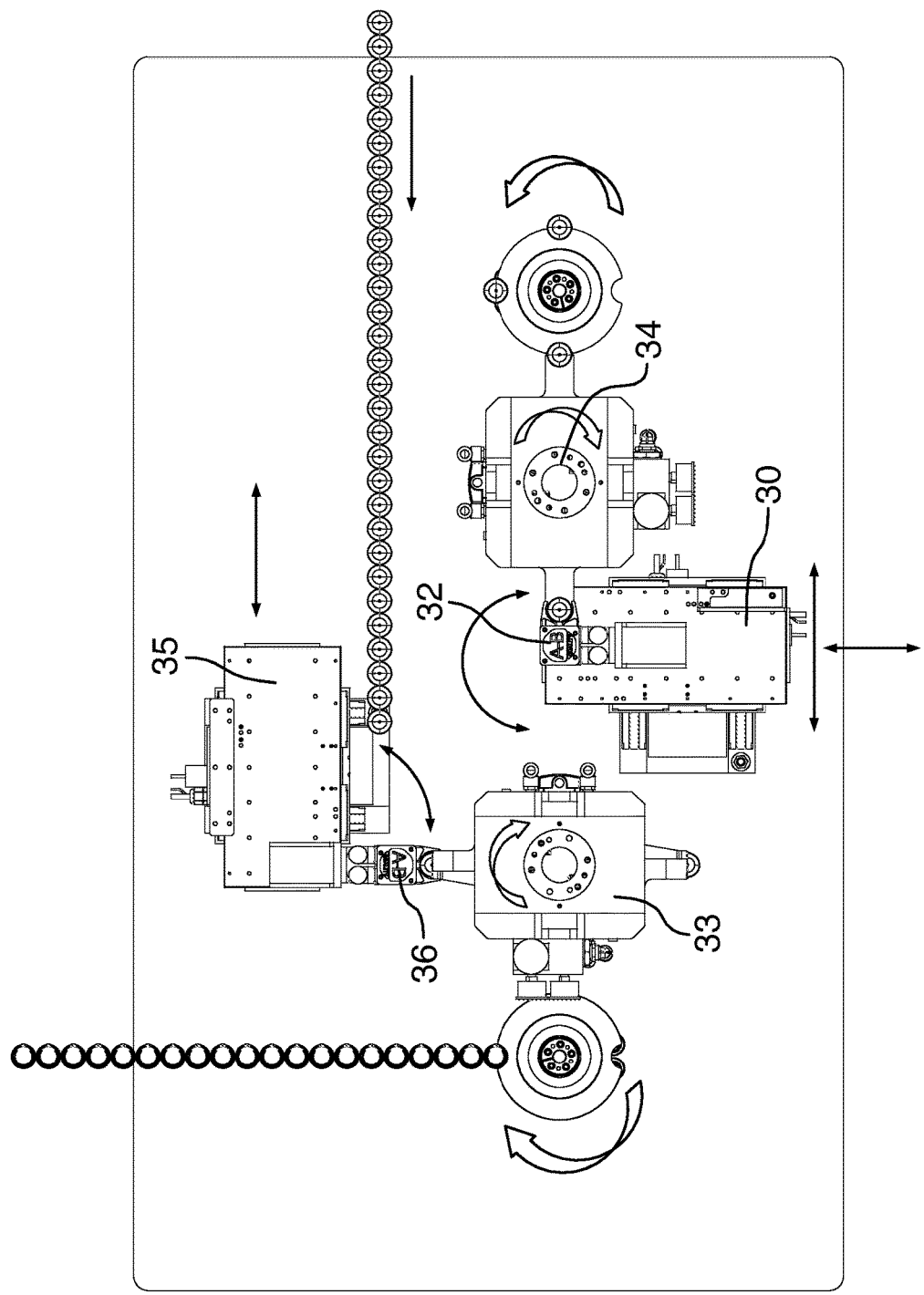
FIG. 23 is a plan view of an assembly device that includes two linear motion platforms each having a rotating gripper to transfer components within a plane.

FIG. 23 is a plan view of a fourth example showing a platform 30 with a rotary gripper 32 to move assembled components from a first rotating assembly tool 33 to a second rotating assembly tool 34. Two orthogonally directed linear servomotors move the platform 30 in an XY Cartesian coordinate reciprocating manner within a plane as indicated by the double headed arrows in FIG. 23. The combination of planar X-Y motion of the platform 30 and rotary motion of the rotary gripper 32 are coordinated in time and motion with the first rotating assembly tool 33 and the second rotating assembly tool 34 to move the assembled components. FIG. 23 also shows a second platform 35 with a second rotary gripper 36 coordinated with the first rotary assembly tool 33 to move components from a stream to the first rotary assembly tool 33. The second rotary gripper 35 includes one linear servomotor and moves reciprocally along one axis only as indicated by the double headed arrow.

Figure 25:
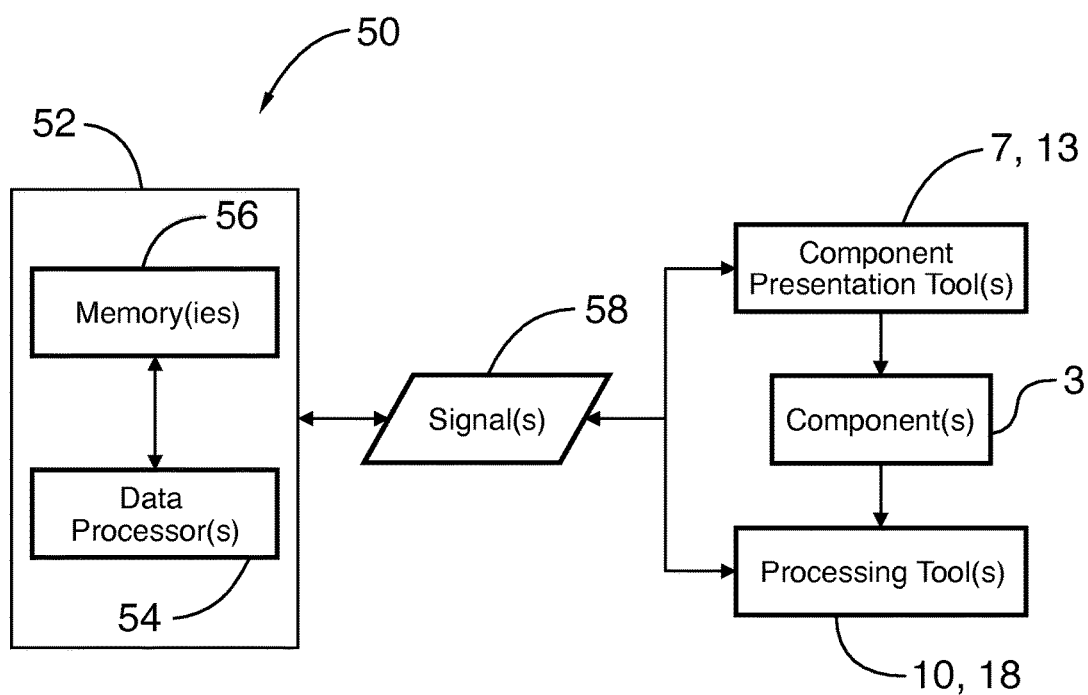
FIG. 25 is a schematic representation of a system for handling components.

FIG. 25 is a schematic representation of an exemplary system 50 for handling one or more components 3. System 50 may comprise one or more component presentation tools 7, 13 which may, for example, be part of one or more component delivery devices 6, 12. In some embodiments, component presentation tool may comprise one or more screws 7, 13. Accordingly, component presentation tool 7, 13 may be configured to: load one or more components 3 at an intake position at a leading end of a stream of like components 3; separate component 3 from the like components 3; accelerate component 3; and deliver component 3 at a predetermined delivery time, delivery position, delivery speed and moving along a delivery trajectory. Component presentation tool 7, 13 may be configured to deliver components 3 before loading one or more subsequent components 3 at the intake position.

System 50 may also comprise one or more processing tools 10, 18 which may, for example, be part of one or more receiving devices 11, 17. Processing tool 10, may be configured to conduct one or more value-added operation using one or more of components 3. For example, processing tool may be configured to assemble two or more of components 3 together. In some embodiments, processing tool 10, 18 may comprise one or more of assembly tools 10, 18. Accordingly, processing tool 10, 18 may be configured to: receive one or more components 3 while processing tool 10, 18 moves along a processing tool trajectory configured to permit transfer of the component(s) 3 at the delivery position from component presentation tool 7, 13 to processing tool 10, 18; process component 3; and move component 3 to an ejection position.

System 50 may also comprise one or more control devices 52 (referred hereinafter as "controller 52"). Controller 52 may comprise one or more data processors 54 (referred hereinafter as "data processor 54") and related accessories that enable control of at least some aspects of performance of component presentation tool 7, 13 and/or processing tool 10, 18. Data processor 54 may, for example, be configured to make decisions regarding the control and operation of system 50 and cause one or more actions to be carried out based on machine-readable instructions including those stored within controller 52 and/or other machine-readable instructions received at controller 52 via wired and/or wireless communication. Data processor 54 may include one or more microcontrollers or other suitably programmed or programmable logic circuits.

Controller 52 may also comprise memory(ies) and memory data devices or register(s) (referred hereinafter as "memory 56"). Memory 56 may comprise any storage means (e.g., devices) suitable for retrievably storing machine-readable instructions executable by data processor 54 of controller 52 and other data. Memory 56 may be non-volatile and may include erasable programmable read only memory (EPROM), flash memory, and/or other electromagnetic media suitable for storing electronic data signals in volatile or non-volatile, non-transient form. Memory 56 may contain machine-readable instructions for execution by data processor 54 and also other data related to the operation of component presentation tool 7, 13 and/or processing tool 10, 18. For example, memory 56 may hold feedback data representative of feedback signals received from one or more sensors (e.g., encoders) associated with component presentation tool 7, 13 and/or processing tool 10, 18.

Machine-readable instructions stored in memory 56 may cause controller 52 to cause the execution of various methods disclosed herein including the generation of one or more signals 58 (e.g., output data) useful in the operation of system 50. Such machine-readable instructions may be incorporated into one or more computer program products which may be stored on suitable medium or media. In some embodiments, the machine-readable instructions may be executable by data processor 54 and configured to cause data processor 54 to generate signals 58 useful in the synchronization of two or more operations carried out by component presentation tool 7, 13 and/or processing tool 10, 18. For example, the machine-readable instructions may be configured to cause data processor 54 to generate signals 58 useful in the synchronization of the delivery of component 3 by component presentation tool 7, 13 and the receipt of component 3 by component processing tool 10, 18.

The synchronization of two or more operations of component presentation tool 7, 13 and processing tool 10, 18 may effectively comprise electronic camming and/or electronic gearing instead of mechanical cams and/or gears used in some existing applications. In various embodiments, the use of such electronic synchronization may provide more flexibility and improved performance of system 50 in comparison with conventional systems comprising mechanical synchronization means. Accordingly, in various embodiments, memory 56 may hold data representative of one or more cam profiles to be used in the operation of component presentation tool 7, 13 and processing tool 10, 18. For example, such cam profile(s) may be in tabular form and may comprise corresponding positions representative of synchronized trajectories to be followed by component presentation tool 7, 13 and processing tool 10, 18 during operation. In various embodiments, one of component presentation tool 7, 13 and processing tool 10, 18 may be operated as a master device and the other of component presentation tool 7, 13 and processing tool 10, 18 may be operated as a slave device executing movements based on the execution of movements by the master device in order to substantially maintain synchronization between the slave device and the master device. In some embodiments, system 50 may comprise one or more master devices and one or more respective slave devices. For example, one or more slave devices may be electronically cammed with a master device.

Accordingly, in various embodiments, the machine-readable instructions may be configured to cause data processor 54 to generate signals 58 useful in causing electronic camming of the delivery of component 3 by component presentation tool 7, 13 and of the receipt of component 3 by processing tool 10, 18. In some embodiments, the machine-readable instructions may be configured to cause data processor 54 to generate signals 58 useful in causing electronic camming of the loading, separation, acceleration and delivery of component 3 by component presentation tool 7, 13, and, of the receipt of component 3 by processing tool 10, 18.

In various embodiments, the machine-readable instructions may be configured to cause data processor to generate signals 58 useful in controlling movement of component 3 along the delivery trajectory and controlling movement of processing tool 10, 18 along the processing tool trajectory. The delivery trajectory and the processing tool trajectory may be substantially tangential at the delivery position of component 3. Similarly, the machine-readable instructions may be configured to cause data processor 54 to generate signals 58 useful in causing the delivery speed of component 3 and a speed of processing tool 10, 18 to be substantially the same when component 3 is at the delivery position. Accordingly, the transfer of component 3 from component presentation tool 7, 13 to processing tool 10, 18 may be relatively smooth (i.e., substantially free of significant acceleration and/or jerk). The smooth transfer or component 3 may also substantially reduce the risk of damaging component 3 and may also permit the transfer of relatively delicate components in some applications.

In various embodiments, the machine-readable instructions may be configured to cause data processor 54 to generate signals 58 useful in controlling at least some aspect of the processing of the component 3. For example, such processing may include one or more value-added operations that may be carried out by processing tool 10, 18. Such value added operation may comprise the assembly of two or more or components 3 together. Such operation or other operations associated with system 50 may also be electronically synchronized with one or more of component presentation tool 7, 13 and processing tool 10, 18 and may also operate as a master device or as a slave device depending on the specific application. Accordingly the machine-readable instructions may, for example, be configured to cause data processor 58 to generate signals useful in causing electronic camming of the processing of component 3 and one or more operations associated with component presentation tool 7, 13 and processing tool 10, 18. Alternatively, one or more operations conducted by component presentation tool 7, 13 or processing tool 10, 18 may be under binary control rather than direct electronic synchronization. However, in some embodiments, the triggering of an operation via a binary control signal may be dependent on the position of the master device and may still be based on the cam profile.

As explained above, system 50 may comprise one or more servomotors 8, 14 (shown in FIG. 1) associated with component presentation tool 7, 13 and one or more servomotors 15, 19 (shown in FIG. 1) associated with processing tool 10, 18. Accordingly, the machine-readable instructions may be configured to cause data processor 54 to generate signals useful in controlling servomotor 8, 14 and servomotor 15, 19 according to a predetermined cam profile.

Figure 26:
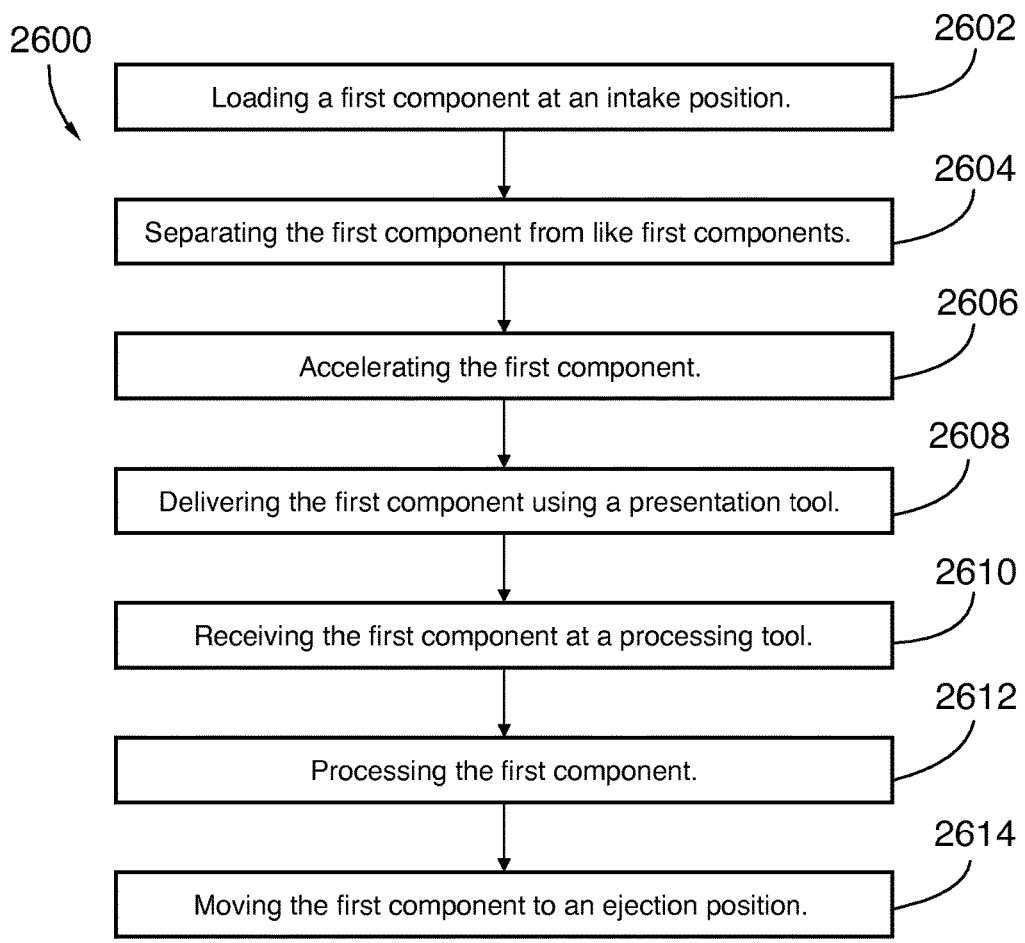
FIG. 26 is flowchart illustrating a method for handling components.

FIG. 26 is flowchart illustrating a method 2600 for handling components. In some embodiments, method 2600 may also comprise the performance of one or more valued-added operations. The devices and tools disclosed herein may be configured for cooperative operation with each other for performing all or part of method 2600. In various embodiments, method 2600 may comprise: loading a first component 3 at an intake position at a leading end of a stream of like first components 3 (see block 2602); separating first component 3 from the like first components (see block 2604); accelerating first component 3 (see block 2606); delivering first component 3 at a predetermined delivery time, delivery position, delivery speed and moving along delivery trajectory using first component presentation tool 7, 13 (see block 2608); receiving first component 3 at processing tool 10, 18 moving along a processing tool trajectory configured to permit transfer of first component 3 at the delivery position from first component presentation tool 7, 13 to processing tool 10, 18; processing first component 3; and moving the first component 3 to an ejection position. The delivering of first component 3 and the receiving of the first component may be electronically synchronized. Method 2600 may also comprise delivering component 3 before loading a subsequent component at the intake position.

As explained above, the delivery trajectory and the processing tool trajectory may be substantially tangential when first component 3 is at the delivery position and the transfer of first component 3 between component presentation tool 7, 13 and processing tool 10, 18 is occurring. Also the delivery speed of first component and a speed of processing tool 10, 18 may be substantially the same when first component 3 is at the delivery position and the transfer of first component 3 is occurring. Method 2600 may also comprise receiving a second component 3 at processing tool 10, 18. Method 2600 may also comprise assembling first component 3 with second component 3. It should be understood that the first and second components may be different from each other and may be configured for assembly with each other.

The delivering of first component 3 may comprise a first computer numerically controlled operation and the receiving of first component 3 may comprise a second computer numerically controlled operation. The first computer numerically controlled operation and the second computer numerically controlled operation may be electronically synchronized (e.g., cammed, geared) as explained above.

Similarly, the loading, separating, accelerating and delivering of first component 3 may comprise a first computer numerically controlled operation and the receiving of first component 3 may comprises a second computer numerically controlled operation. The first computer numerically controlled operation and the second computer numerically controlled operation may be electronically synchronized (e.g., cammed, geared).

Instead or in addition, the receiving of first component 3 may comprise a first computer numerically controlled operation and the processing of first component may comprise a second computer numerically controlled operation. The first computer numerically controlled operation and the second computer numerically controlled operation may be electronically synchronized (e.g., cammed, geared).

Figure 27:
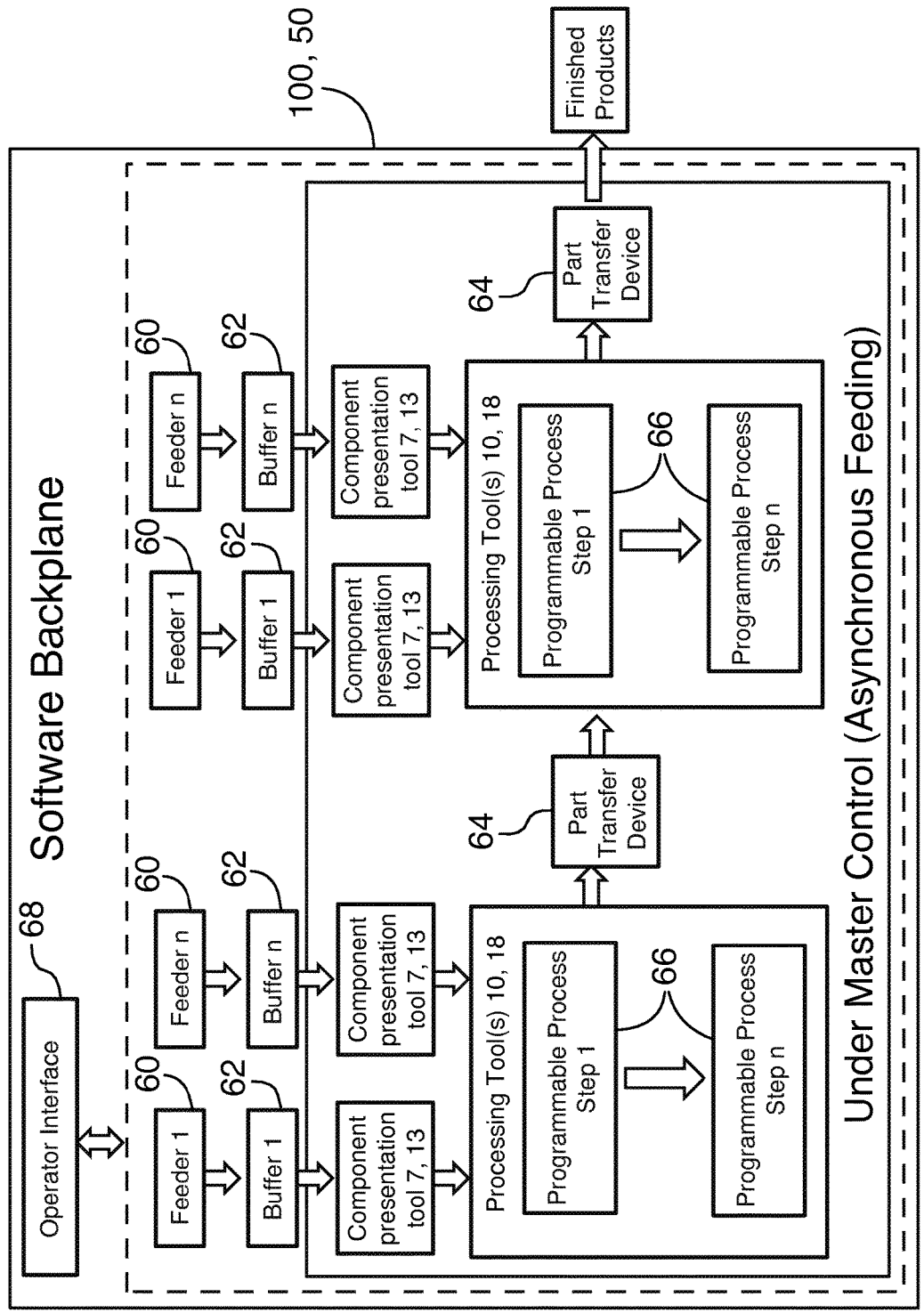
FIG. 27 is a schematic representation of a system for processing components using asynchronous feeding of components.
Figure 28:
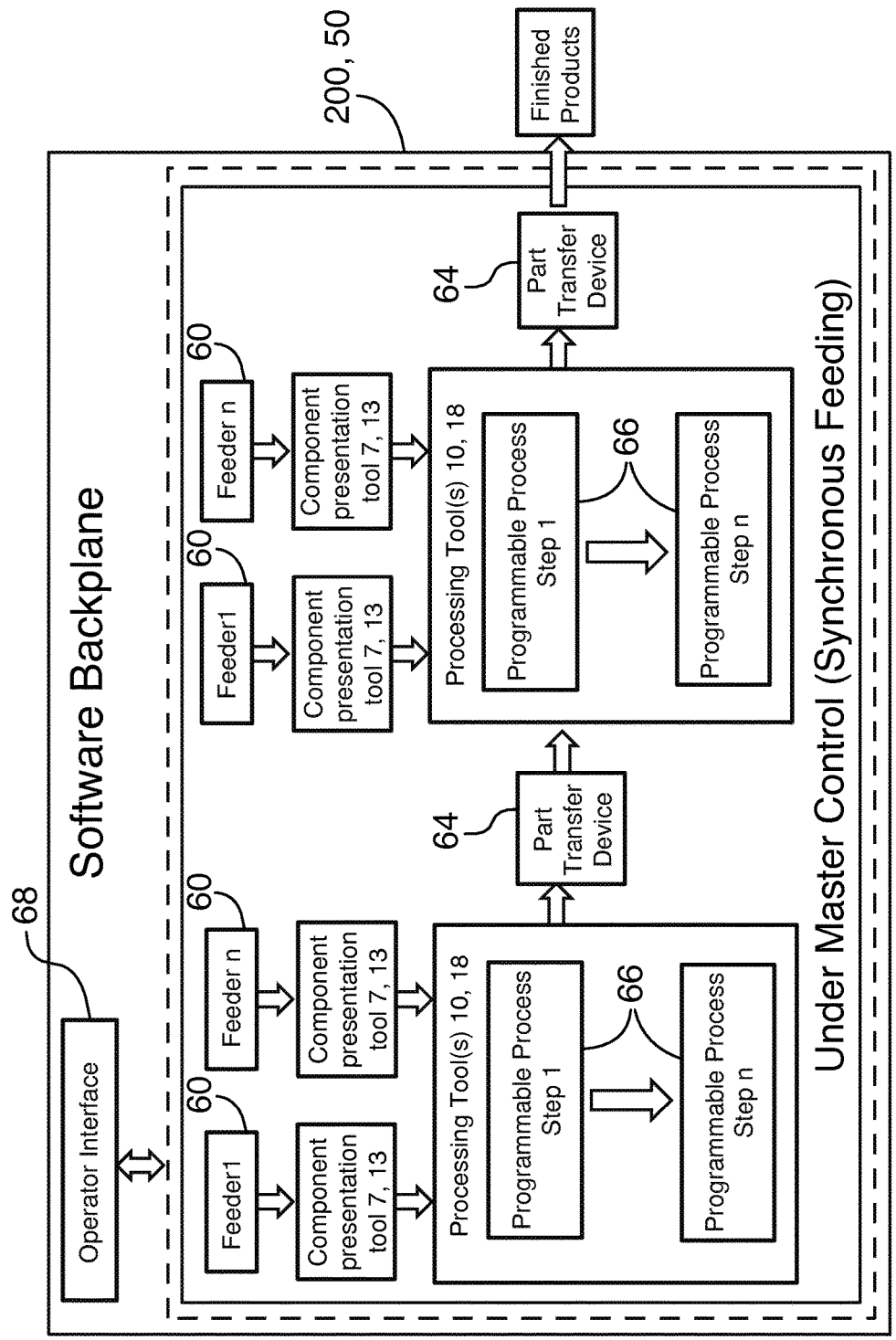
FIG. 28 is a schematic representation of a system for processing components using synchronous feeding of components.

FIG. 27 is a schematic diagram of an exemplary system 100, 50 for processing components using asynchronous feeding of components and FIG. 28 is a schematic diagram of a another exemplary system 200, 50 for processing components using synchronous feeding of components. Systems 100 and 200 may have similarities with system 50 explained above. In some embodiments, system 50 may be incorporated in whole or in part into one or both of systems 100 and 200. Systems 100 and 200 may be configured to carry out steps from or entire methods disclosed herein. Systems 100, 200 may receive components 3 and/or other raw materials as inputs; progressively add value to them via one or more processing tools 10, 18; and finally discharges them either as discrete finished products, as unfinished products or as rejected scrap (i.e., defective products).

Accordingly, systems 100 and 200 may receive raw materials and/or components 3 from one or more feeders 60. Each feeder 60 may be configured to deliver its raw materials or components 3 to one or more component presentation tools 7, 13. The delivery from the feeders 60 may be done directly or via a respective buffer 62. Each component presentation tools 7, 13 or part transfer device 64 may be numerically controlled and configured to deliver raw materials or components to one or more processing tools 10, 18. Each processing tool 10, 18 may add value to a component or work-in-progress via one or more programmable process steps 66. A given processing tool 10, 18 may operate in parallel to and/or in series with one or more other processing tools 10, 18. Once the work-in-process passes through a final processing tools 10, 18, it may be discharged either as a successfully completed and validated finished product, as an unfinished product or as rejected scrap. Human interaction with systems 100 and 200 may be done via operator interface 68.

The various elements described above may be controlled at least in part by software resources known as base software backplane. The backplane may be configured to permit various elements of system to carry out various control functions including: management of inputs and outputs; management of local control tasks, including programmable process steps 66 within processing tools 10, 18 and local inspection tasks within validation stations 70; communications between different elements in system 100, 200 and communication with a human user via operator interface 68.

In system 100, 50 of FIG. 27, feeders 60 may not be electronically synchronized with any other element or operation of system 100, 50 and may be controlled by software backplane and the operation of feeders 60 may still be in harmony with other elements of system 100, 50. Accordingly, feeders 60 may supply components 3 to component presentation tools 7, 13 via buffers 62 (e.g., asynchronous feeding) and feeders 60 may be operated to keep a sufficient supply of components 3 in respective buffers 62. Alternatively, in system 200, 50 of FIG. 28, feeders 60 may be electronically synchronized with one or more element or operation of system 200, 50 and may under the control of a master device for example in order to provide synchronous feeding of components 3 directly (i.e., without buffers) to component presentation tools 7, 13.

At least part of systems 50, 100, 200 may comprise a numerically synchronized control architecture. In various embodiments, part transfer devices 64, component presentation tools 7, 13 and processing tools 10, 18 may be numerically controlled. Accordingly, movements of components 3 such as raw materials and work-in-process through systems 100 and 200 may occur along programmable axes of motion, which can be either rotary or linear. Movement of tooling associated with programmable process steps 66 of processing tools 10, 18 may also take place along programmable linear and/or rotary axes of motion.

Figure 29:
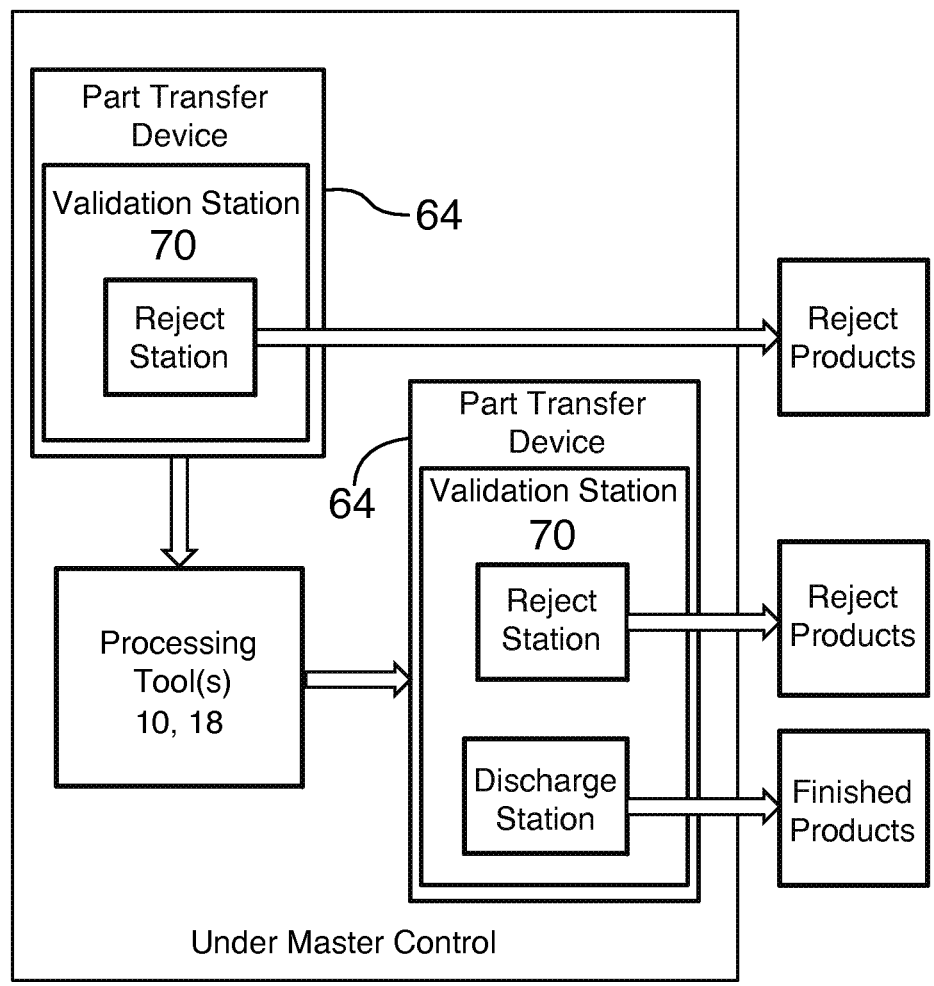
FIG. 29 is a schematic representation of part transfer devices comprising validation stations.

FIG. 29 is a schematic representation of an exemplary part transfer devices 64 comprising validation stations 70. Validation stations 70 may located at one or more feeders 60, component presentation tools 7, 13, part transfer devices 64 and/or processing tools 10, 18. Validation stations 70 may comprise devices configured to conduct inspections, checks, or tests on one or more of components 3 such as raw materials or work-in-process. At these points, such components 3 may be eliminated from system 100, 200 as scrap if they do not meet one or more predetermined inspection criteria. Validation station 70 may be configured to conduct an inspection operation on one or more of components 3. The inspection operation may be electronically synchronized with a master device of system 50, 100, 200.

Although the above description relates to a specific preferred embodiment as presently contemplated by the inventor, it will be understood that the invention in its broad aspect includes mechanical and functional equivalents of the elements described herein.

We claim:

1. An automated device comprising:
   a first delivery device including:
      a first component presentation tool; and
      a first dedicated computer numerically controlled tool drive for loading, separating, accelerating and delivering a first component, from an intake position at a leading end of a stream of first components, to output the first component at a predetermined delivery time, output position of the first component presentation tool, speed, acceleration and trajectory; and
   a first receiving device including:
      a tool for receiving, while the tool moves along a tool trajectory, and processing the first component; and
      a tool drive for moving the tool between: the output position of the first component presentation tool; and a finished piece ejection position;
   wherein the first dedicated computer numerically controlled tool drive includes programmable controls to independently select the time, position, speed, acceleration and trajectory of the first component in a series of independently programmable first component stages, comprising: a loading stage; a separating stage; an accelerating stage; and a delivery stage.

2. The automated device according to claim 1, wherein the automated device is for assembling the first component and a second component into a finished piece in an assembly process, the automated device further comprising:
   a second delivery device including:
      a second component presentation tool; and
      a second tool drive for loading, separating, accelerating and delivering a second component, from an intake position at a leading end of a stream of second components, to output the second component at a predetermined delivery time, output position of the second component presentation tool, speed, acceleration and trajectory;
   the first receiving device including:
      an assembly tool for receiving and assembling the first component and the second component together as the tool for receiving and processing the first component; and
   the tool drive of the first receiving device moving the assembly tool between: the output position of the first component presentation tool; the output position of the second component presentation tool; and the finished piece ejection position.

3. The automated device according to claim 2 wherein the second tool drive comprises:
   a second dedicated computer numerically controlled tool drive including programmable controls to independently select the time, position, speed, acceleration and trajectory of the second component in a series of independently programmable second component stages, comprising: a loading stage; a separating stage; an accelerating stage; and a delivery stage.

4. The automated device according to claim 3 wherein the tool drive of the first receiving device comprises programmable controls to independently select the time, position, speed, acceleration and trajectory of the tool during a series of independently programmable stages, comprising: a first component receipt stage; and a finished piece ejection stage.

5. The automated device according to claim 1 wherein the tool drive of the first receiving device comprises:
   a dedicated computer numerically controlled tool drive including programmable controls to independently select the time, position, speed, acceleration and trajectory of the tool in a series of independently programmable stages, comprising: a first component receipt stage; and a finished piece ejection stage.

6. The automated device according to claim 1 wherein the first component presentation tool comprises:
   a rotary screw having a helical groove with a profile matching a portion of the first component, the rotary screw having a component intake port at a proximal end of the helical groove and a component output port at a distal end of the helical groove, for capturing and guiding the first component axially along a stationary axial slide surface.

7. The automated device according to claim 6 wherein the helical groove has a uniform profile.

8. The automated device according to claim 6 wherein the rotary screw includes a proximal dwell shoulder extending radially therefrom into engagement with a forward surface of a lead first component of the stream of first components, the intake port being located in a segment of the proximal dwell shoulder.

9. The automated device according to claim 8 wherein a downstream edge of the intake port comprises a separating wedge for insertion between the lead first component and an adjacent following first component of the stream of first components.

10. The automated device according to claim 9 wherein the first dedicated computer numerically controlled tool drive comprises a rotary servomotor including programmable controls to independently select the rotary speed of the first component in: a loading stage wherein the rotary speed is 0 degree/sec; a separating stage wherein the rotary speed is 0-1000 degree/sec; an accelerating stage wherein the rotary speed is 1000-7000 degree/sec; and a delivery stage wherein the rotary speed is 7000-6000 degree/sec.

11. The automated device according to claim 1 wherein:
the first component presentation tool comprises a rotary disc having a mounting to engage a portion of the first component; and
the first dedicated computer numerically controlled tool drive comprises a rotary servomotor for loading, separating, accelerating and delivering the first component mounted on the rotary disc, from an intake position, through a low speed separating stage, through a high speed accelerating stage, to present the first component at the output position and delivery speed.

12. The automated device according to claim 1 wherein:
the first component presentation tool comprises a platform having a mounting to engage a portion of the first component; and
the first dedicated computer numerically controlled tool drive comprises a planar pair of linear servomotors each with a linear operating axis disposed orthogonally relative to each other for loading, separating, accelerating and delivering the first component mounted on the platform, from an intake position, through a low speed separating stage, through a high speed accelerating stage, to present the first component at the output position and delivery speed.

13. The automated device according to claim 12 wherein the first dedicated computer numerically controlled tool drive comprises a third linear servomotor with a linear operating axis disposed orthogonally relative to the planar pair of linear servomotors for loading, separating, accelerating and delivering the first component mounted on the platform within a three dimensional operating space.

14. The automated device according to claim 1 wherein the tool of the first receiving device is operated with one of: a rotary servomotor; and a linear servomotor.

15. The automated device according to claim 14 wherein the tool includes at least one of: a control signal slip ring for communicating electronic control signals; and an electrical power supply slip ring for transmitting electrical power.

16. The automated device according to claim 1 comprising a second receiving device including:
a tool for receiving and processing the finished piece; and
a tool drive for moving the tool between: the ejection position of the first receiving device; and a second ejection position.

17. The automated device according to claim 16, wherein the tool drive of the second receiving device comprises a second dedicated computer numerically controlled tool drive including programmable controls to independently select the time, position, speed, acceleration and trajectory of the second component in a series of independently programmable second component stages, comprising: a loading stage; a separating stage; an accelerating stage; and a delivery stage; and
wherein the second dedicated computer numerically controlled tool drive and the tool drive of the second receiving device are electronically synchronized.

18. The automated device according to claim 16,
wherein the tool drive of the second receiving device comprises a second dedicated computer numerically controlled tool drive including programmable controls to independently select the time, position, speed, acceleration and trajectory of the second component in a series of independently programmable second component stages, comprising: a loading stage; a separating stage; an accelerating stage; and a delivery stage; and
wherein the second dedicated computer numerically controlled tool drive and the tool drive of the second receiving device are electronically cammed.

19. The automated device according to claim 16,
wherein the tool drive of the second receiving device comprises a second dedicated computer numerically controlled tool drive including programmable controls to independently select the time, position, speed, acceleration and trajectory of the second component in a series of independently programmable second component stages, comprising: a loading stage; a separating stage; an accelerating stage; and a delivery stage; and
wherein two or more of the first dedicated computer numerically controlled tool drive, the tool drive of the first receiving device, the second dedicated computer numerically controlled tool drive, and the tool drive of the second receiving device are electronically cammed.

20. The automated device according to claim 1, wherein the first dedicated computer numerically controlled tool drive and the tool drive of the first receiving device are electronically synchronized.

21. The automated device according to claim 1, wherein the first dedicated computer numerically controlled tool drive and the tool drive of the first receiving device are electronically cammed.

22. A method comprising:
loading a first component at an intake position at a leading end of a stream of like first components;
separating the first component from the stream of first components;
accelerating the first component;
delivering the first component at a predetermined delivery time, delivery position, delivery speed and moving along a delivery trajectory using a first component presentation tool wherein the predetermined delivery time, delivery position, delivery speed, a delivery acceleration and delivery trajectory of the first component are independently selected in a series of independently programmable first component stages, comprising: a loading stage; a separating stage; an accelerating stage; and a delivery stage;
receiving the first component at a processing tool moving along a processing tool trajectory configured to permit transfer of the first component at the delivery position from the first component presentation tool to the processing tool, the delivering of the first component and the receiving of the first component being electronically synchronized;

processing the first component; and
moving the first component to an ejection position.

23. The method as defined in claim 22, wherein the delivery trajectory and the processing tool trajectory are tangential when the first component is at the delivery position.

24. The method as defined in claim 22, comprising receiving a second component at the processing tool.

25. The method as defined in claim 22, wherein the delivery speed of the first component and a speed of the processing tool are the same when the first component is at the delivery position.

26. The method as defined in claim 24, wherein the processing of the first component comprises assembling the first component with the second component.

27. The method as defined in claim 22, wherein the delivering of the first component comprises a first computer numerically controlled operation and the receiving of the first component comprises a second computer numerically controlled operation, the first computer numerically controlled operation and the second computer numerically controlled operation being electronically cammed.

28. The method as defined in claim 22, wherein the loading, separating, accelerating and delivering of the first component comprise a first computer numerically controlled operation and the receiving of the first component comprises a second computer numerically controlled operation, the first computer numerically controlled operation and the second computer numerically controlled operation being electronically cammed.

29. The method as defined in claim 22, wherein the receiving of the first component comprises a first computer numerically controlled operation and the processing of the first component comprises a second computer numerically controlled operation, the first computer numerically controlled operation and the second computer numerically controlled operation being electronically cammed.

30. The method as defined in claim 22, wherein the delivering of the first component occurs before loading of a subsequent component at the intake position.

31. A system comprising:
a component presentation tool configured to: load a first component at an intake position at a leading end of a stream of first components; separate the first component from the stream of first components; accelerate the first component; and deliver the first component at a predetermined delivery time, delivery position, delivery speed and moving along a delivery trajectory;
a processing tool configured to: receive the first component while the processing tool moves along a processing tool trajectory configured to permit transfer of the first component at the delivery position from the component presentation tool to the processing tool; process the first component; and move the first component to an ejection position;
a data processor enabling control such that the time, position, speed, acceleration and trajectory of the first component are selected independently in a series of independently programmable first component stages, comprising: a loading stage; a separating stage; an accelerating stage; and a delivery stage; and
a medium comprising machine-readable instructions executable by the data processor and configured to cause the data processor to generate signals useful in the synchronization of the delivery of the first component by the component presentation tool and the receipt of the first component by the processing tool.

32. The system as defined in claim 31, wherein the machine-readable instructions are configured to cause the data processor to generate signals useful in controlling movement of the first component along the delivery trajectory and controlling movement of the processing tool along the processing tool trajectory.

33. The system as defined in claim 31, wherein the delivery trajectory and the processing tool trajectory are tangential at the delivery position of the first component.

34. The system as defined in claim 31, wherein the machine-readable instructions are configured to cause the data processor to generate signals useful in causing the delivery speed of the first component and a speed of the processing tool to be the same when the first component is at the delivery position.

35. The system as defined in claim 34, wherein the machine-readable instructions are configured to cause the data processor to generate signals useful in causing assembly of the first component with a second component.

36. The system as defined in claim 31, wherein the machine-readable instructions are configured to cause the data processor to generate signals useful in controlling the processing of the first component.

37. The system as defined in claim 31, wherein the machine-readable instructions are configured to cause the data processor to generate signals useful in causing electronic camming of the delivery of the first component and of the receipt of the first component.

38. The system as defined in claim 31, wherein the machine-readable instructions are configured to cause the data processor to generate signals useful in causing electronic camming of the loading, separation, acceleration and delivery of the first component, and, of the receipt of the first component.

39. The system as defined in claim 31, wherein the machine-readable instructions are configured to cause the data processor to generate signals useful in causing electronic camming of the processing of the first component and one or more operations associated with the component presentation tool and the processing tool.

40. The system as defined in claim 31, comprising a first servomotor associated with the component presentation tool and a second servomotor associated with the processing tool, the machine-readable instructions being configured to cause the data processor to generate signals useful in controlling the first servomotor and the second servomotor according to a cam profile.

41. The system as defined in claim 31, comprising one or more validation stations configured to conduct an inspection operation on the first component.

42. The system as defined in claim 31, wherein the component presentation tool is configured to deliver the first component before loading a subsequent component at the intake position.

* * * * *